United States Patent [19]
Kobayashi et al.

[11] Patent Number: 5,442,811
[45] Date of Patent: Aug. 15, 1995

[54] LOOP TESTABLE RADIO TRANSMITTERS/RECEIVERS

[75] Inventors: Fumihiko Kobayashi; Eiji Itaya, both of Kawasaki, Japan

[73] Assignee: Fujitsu Limited, Kawasaki, Japan

[21] Appl. No.: 100,553

[22] Filed: Jul. 30, 1993

[30] Foreign Application Priority Data

Dec. 14, 1992 [JP] Japan .................. 4-333168
Jul. 21, 1993 [JP] Japan .................. 5-179719

[51] Int. Cl.$^6$ .................................. H04B 17/00
[52] U.S. Cl. ........................ 455/67.3; 455/115; 455/84
[58] Field of Search ............ 455/226.1, 84, 85, 86, 455/67.3, 67.1, 67.4, 115, 87

[56] References Cited
FOREIGN PATENT DOCUMENTS

| | | | |
|---|---|---|---|
| 4078237 | 3/1992 | Japan | 455/67.1 |
| 4094224 | 3/1992 | Japan | 455/67.4 |
| 4249932 | 9/1992 | Japan | 455/67.1 |

Primary Examiner—Edward F. Urban
Assistant Examiner—Doris To

[57] ABSTRACT

A loop testable radio transmitter/receiver includes a transmission system which includes a transmission frequency converting unit and a transmission signal filter unit. A receiving system is provided, including a receiving signal filter and a receiving frequency converter. The transmitter/receiver further includes a transmitter/receive sharing unit, a transmission signal looping unit for attenuating the transmission signal of the transmission system and for looping back it to the receiving system, and a shifter arranged to the output side of the receiving frequency converting unit in the receiving system for converting an intermediate frequency of a signal converted by the receiving frequency converting unit into the receiving input frequency of a modulator/demodulator.

21 Claims, 26 Drawing Sheets

RADIO SUPERVISORY
CONTROL CHANNEL

LOOP TESTABLE RADIO TRANSMITTERS/RECEIVERS

BACKGROUND OF THE INVENTION

1. Field of the Invention

The present invention relates to a loop testable radio transmitter/receiver.

2. Description of the Related Art

In recent years, with the spread of the value added network, an economical radio communication equipment which enables easy installation working has been demanded. For the improved reliability of circuits for advanced information, the quick separation work and restoring work of failed equipment at trouble state is required.

Moreover, recently, the development of a small, enclosed, outdoor mountable radio communication system substantially built-in with an antenna is being required, such as radio communication equipment for communications between mobile communication base stations or offices, ultra-small earth station radio communication equipment for satellite communications, and the like. Such an outdoor radio communication equipment requires a self-diagnosis function for the loop testing to confirm and evaluate its performance at maintenance. However its structures and its general installation conditions do not allow to equip the looping tester outside the equipment body. Thus, it is necessary to arrange a circuit for receiving a self-transmission signal to the receiving input and for converting it to an intermediate frequency signal, inside the equipment body.

A radio transmitter/receiver, for example, as shown in FIG. 31, includes an indoor equipment 200, an outdoor equipment 201, and IF cables 202 interfacing the equipment 200 with the equipment 201. The indoor equipment 200 is formed of a modulator/demodulator 100 and a digital component 101. The outdoor equipment 201 is formed of a transmission frequency converter (up-converter) 1, a transmission filter 2, a receiving frequency converter (down-converter) 5, a receiving filter 3, and a transmit/receive sharing unit 4. In FIG. 31, numeral 203 represents a transmit/receive antenna.

In this type of the radio transmitter/receiver, in order to execute a loop testing of the indoor equipment 200 and outdoor equipment 201, an examiner must go to the test field to install looping means between the terminal A and B of the indoor equipment 200 and to install shifter looping means between the terminals C (or C') and D (or D') of the outdoor equipment 201.

However, such a loop testing method takes much time because an examiner must go to every test spot to install the loop testing means.

For that reason, a loop testable radio transmitter/receiver, as shown in FIG. 28, has been proposed. The radio transmitter/receiver is formed of a transmission system TS, a receiving system RS, a transmit/receive sharing unit 4, and a looping component (RF LOOP) 6. The transmission system TS has an up-converter (transmission frequency converting means (TCONV)) 1, and a transmission filter (transmission signal filter means (TBF) 2. The receiving system RS has a receiving filter (receiving signal filter means (RBF)) 3, and a down-converter (receiving frequency converting means (RCONV)) 5.

The up-converter 1 converts a transmission intermediate frequency signal (transmission IF signal) from the modulator/demodulator (MODEM) 100 into a transmission frequency signal (transmission RF signal) and is formed of a local oscillator 11, a mixer 12, and a high-power amplifier (HPA) 13.

The transmission filter 2 suppresses an undesired wave contained in the transmission frequency signal from the up-converter 1. The receiving filter 3 suppresses an undesired wave contained in the receiving RF signal. A band pass filter is used for the filters 2 and 3.

The down-converter 5 converts a signal from the receiving filter 3 a receiving intermediate frequency signal (receiving IF signal) to send the modulator/demodulator 100. The converter 5 includes a local oscillator 51, a mixer 52, and a low noise amplifier (LNA) 53.

The transmit/receiver sharing unit 4 outputs a transmission signal from the transmission system TS to the antenna 203 while it outputs a receiving signal from the antenna 203 to the receiving system RS. The looping component 6 converts the transmission signal of the transmission system TS into a receiving frequency signal and attenuates the outcome to loop back to the receiving system RS. The looping component 6 includes an attenuator 61, a RF change-over switches 62 and 63, a shifter 64, and a filter 65.

In this case, since it is better to separate off a failed device unit by looping at a place near to the output terminal of the equipment, the looping of the radio transmitter/receiver must be performed in the RF band. The looping component 6 is, as shown in FIG. 28, is constructed so as to loop back from the output of the high-power amplifier 13 to the input of the low noise amplifier 53. An ideal signal looping point is the point E shown in FIG. 28. However, since the failure rate of the passive elements such as the filters 2 and 3, the sharing unit 4, and the like is extremely small, the looping point is set at the E spot.

The attenuator (resistor) 61 attenuates the loop signal to the same level as that of the receiving signal. The RF change-over switch 62 switches a transmission signal to either the looping side or the transmission side. The RF change-over switch 63 switches to a loop signal or a receiving signal. The RF change-over switches 62 and 63 are formed of a waveguide WG as shown in FIG. 29 or pin-diodes PD1 and PD2, as shown in FIG. 30. In FIG. 30, C1 to C3 represent a dc-cut capacitor, C4 and C5 represent a capacitor, and L1 to L3 represent a coil. Pulses in a repulsive phase are applied through the coils L1 and L2. A high-level signal can make the pin-diode PD1 conductive and also can make the pin-diode PD2 conductive.

The shifter 64, which includes a local oscillator 66 and a mixer 67, converts the transmission signal in the transmission system TS into a a receiving frequency signal. The filter 65 is a sharp response filter for separating a transmission frequency signal from a receiving frequency signal.

In the above configuration, the up-converter 1 converts the transmission IF signal from the outdoor modulator/demodulator 100 into a frequency signal and the high-power amplifier 13 amplifies it to a desired output level. The amplified signal is supplied as a transmission output signal to the antenna feeding end via the transmit/receive sharing unit 4.

The receiving signal is amplified sufficiently by the low noise amplifier 53, subjected to a frequency conversion by the down-converter 5, and then transmitted as a receiving IF signal to the modulator/demodulator 100.

In the case of a loop testing, the looping unit 6 converts a transmission signal into a signal of a receiving frequency, attenuates further the resultant signal, and then loops back it to the receiving system RS, whereby it can be judged whether the devices before the looping point are normal or abnormal.

However, since being formed as a high frequency circuit, the looping component 6 shown in FIG. 28 is costly structurally and materially. Particularly, the looping unit used over microwave or submillimeter wave band is very expensive.

Since the switch 62 arranged at the output of the high power amplifier 13 and the switch 63 arranged at the input of the low noise amplifier 53 cause an insertion loss, a waveguide-type switch (shown in FIG. 29) is often used to reduce the loss. The waveguide switch is very expensive and large in structure and occupies a large space in the whole equipment.

Furthermore, the conventional equipment requires a local oscillator 66 for loop frequency conversion which has good frequency stability and good C/N (carrier to noise) ratio characteristics. Generally, A sharp response filter 65 is needed to the output of the shifter 64 because the transmission frequency is relatively close to the receiving frequency.

As described above, there are disadvantages in that forming a return loop in the RF band leads to a costly, bulky radio transmitter/receiver.

SUMMARY OF THE INVENTION

The present invention is made to overcome the above mentioned problems. An object of the present invention is to provide an economical radio transmitter/receiver.

Particularly another object of the present invention is to provide a radio transmitter/receiver including an outdoor radio transmitter/receiver and an indoor modulator/demodulator coupled to each other by way of an I/F cable and having a failed device separating function which can realize the miniaturization and reduced cost without the RF looping function.

In order to achieve the above object, a loop testable radio transmitter/receiver of the present invention is characterized by a transmission system including transmission frequency converting means for converting an intermediate frequency signal from a modulator/demodulator into a transmission frequency signal, and a transmission signal filter means for suppressing an undesired wave contained in a transmission frequency signal from the transmission frequency converting means; a receiving system including receiving signal filter means for suppressing an undesired wave contained in a receiving frequency signal, and receiving frequency converting means for converting a signal from said receiving signal filter means into an intermediate frequency signal for the modulator/demodulator; transmit/receive sharing means for outputting the transmission signal from the transmission system to an antenna and for outputting the receiving signal from the antenna to the receiving system; transmission signal looping means for attenuating the transmission signal of the transmission system and for looping back it to the receiving system; and shifter means arranged to the output side of the receiving frequency converting means in the receiving system for converting an intermediate frequency of a signal converted by the receiving frequency converting means into a receiving input frequency of the modulator/demodulator.

In this case, the transmission signal looping means is constituted of branching means for deriving a transmission signal from a transmission frequency band region of the transmission system, synthesizing means for inputting a loop transmission signal to a receiving frequency band region of the receiving system, and attenuator arranged between the branching means and the synthesizing means.

At least one of the branching means and the synthesizing means may be constituted as a change-over switch.

The transmission signal looping means may be inserted between a transmission frequency band region between the transmission frequency converting means and the transmission signal filter means in the transmission system and a receiving frequency band region between the receiving frequency converting means and the receiving signal filter means in the receiving system.

The transmission signal looping means is inserted between the transmission frequency band region of the output side of the transmission signal filter means in the transmission system, and the receiving frequency band region of the input side of the receiving signal filter means in the receiving system.

Furthermore, the transmit/receive sharing means acts as the transmission signal looping means and the on/off switch may be arranged near to the input side, comparing the location of the synthesizing means in the receiving system.

The attenuator is constituted as a variable attenuator. The testable radio transmitter/receiver further includes a receiving input level means for detecting a receiving input level, and control means for controlling an attenuation amount of the attenuator in accordance with a receiving input level detected by the receiving input level detecting means.

Moreover, the intermediate frequency signal looping means may be arranged to loop back an intermediate frequency signal in the transmission system to the input side of said shifter means.

In this case, the intermediate frequency signal looping means is constituted of branching means for taking out a signal from an intermediate frequency band region of the transmission system; synthesizing means for inputting the loop transmission signal to the intermediate frequency band region in the receiving system; and attenuator inserted between the branching means and the synthesizing means.

At least one of the branching means and synthesizing means is constituted as a change-over switch.

The attenuator is constituted as a variable attenuator. The loop testable radio transmitter/receiver further includes receiving input level detecting means for detecting a receiving input level, and control means for controlling an attenuation amount of the attenuator in accordance with the receiving input level detected by the receiving input level detecting means.

Furthermore, the shifter means is constituted of transmission signal shifter means for converting a transmission signal of an intermediate frequency band converted by the receiving frequency converting means, into a receiving input frequency of the modulator/demodulator; by-pass means for by-passing the transmission signal shifter means; and selecting means for inputting selectively the output of the receiving frequency converting means to either transmission signal shifter means or the by-pass means.

In this case, a switching means for deriving a signal from either the transmission signal shifter means or the by-pass means, in cooperation with the selecting means may be arranged.

The shifter means is constituted of a first local oscillator for frequency conversion at a normal operation time; a second local oscillator for frequency conversion at a looping operation time; switching means for outputting selectively either the output from the first frequency converting local oscillator or the output from the second frequency converting local oscillator; and a mixer for converting the intermediate frequency signal to a receiving input frequency of the modulator/demodulator in receipt of the output from the switching means and an intermediate frequency signal from the receiving frequency converting means.

In this case, the modulator/demodulator includes control means for transmitting at a loop testing to a remote communication office a command for halting a transmission from the remote communication office to an intra-office may be arranged.

The shifter means is constituted of a dc power supply for a normal operation time; a local oscillator for frequency conversion at a loop test operation time; switching means for outputting selectively either the output from the dc power supply or the output from the frequency converting local oscillator; and a mixer for converting the intermediate frequency signal to the receiving input frequency of the modulator/demodulator, in receipt of the output from the switching means and the output from the intermediate frequency signal from the receiving frequency converting means.

In this case, the switching means is constituted of a hybrid circuit inserted between the dc power supply and the frequency converting local oscillator, and the mixer; a first dc switch inserted between the dc power supply and the hybrid circuit; and a second dc switch inserted between the frequency converting local oscillator and a dc power supply for supplying drive electric power to the frequency converting local oscillator.

Control means are arranged which turns on said first dc switch at a normal operation time while turning off said second dc switch, and turns off said first dc switch at a looping operation time while turning on the second dc switch.

The hybrid circuit may be formed of a bias T-circuit. The frequency converting local oscillator is constituted as a frequency synthesizer and further is constituted of control means for controlling the oscillating frequency of said frequency synthesizer in accordance with the transmission frequency of a transmission signal in the transmission system.

In the loop testable radio transmitter/receiver with the above configuration of the invention, an intermediate frequency signal from the modulator/demodulator is converted to a transmission frequency signal by a transmission frequency converting means in a transmission system, suppressed in an undesired wave by a transmission signal filter means, and then transmitted by an antenna via receiving frequency converting means.

The signal received by an antenna is inputted to a receiving signal filter means via a transmit/receive sharing means. After the transmission signal filter means suppresses the undesired wave of the received signal, the outcome is converted to an intermediate frequency signal for the modulator/demodulator by the receiving frequency converting means.

During the looping testing, the transmission signal looping means attenuates the transmission signal in the transmission system and loops back it to the receiving signal system. The loop signal passes through the receiving frequency converting means and then is converted to a receipting input frequency of the modulator/demodulator by the shifter means.

In the transmission signal looping means which is constituted of branching means for taking out a transmission signal from the transmission frequency band region in the transmission system, synthesizing means for inputting a looping transmission signal to the receiving frequency band region in the receiving system, and an attenuator inserted between the branching means and the synthesizing means, a transmission signal is derived by the branching means, attenuated by the attenuator, and then inputted as a looping transmission signal to the receiving frequency band region in the receiving system via the synthesizing means.

When constituting at least one of the branching means and the synthesizing means, a change-over switch is changed at the normal transmission/receiving time and at the loop testing time.

Moreover, in the transmission signal looping means, which is arranged between a transmission frequency band region between the transmission frequency converting means and the transmission signal filter means in the transmission system and a receiving frequency band region between the receiving signal filter means and the receiving frequency converting means in the receivilng system, the looping transmission signal of the transmission frequency band is inputted into the transmission signal looping means and is derived from the receiving frequency band region.

In the transmission signal looping means also, which is arranged between the transmission frequency band region of the output side of the transmission signal filtering means in the transmission system and the receiving frequency band region of the input side of the receiving signal filter means in the receiving system, a loop transmission signal of the transmission frequency band region is inputted to the transmission signal looping means and is derived from the receiving frequency band region.

When the transmit/receive sharing means acts as a transmission signal looping means, the loop transmission signal is sent to the receiving system via the transmit/receive sharing means.

When being arranged close to the input than the location of the synthesizing means in the receiving system, an on/off switch is turned on or off at a normal transmit/receive time or a loop testing time.

Moreover when the attenuator is consisted of as a variable attenuator, the testable radio transmitter/receiver further includes receiving input level detecting means for detecting a receiving input level and control means for controlling the attenuation amount of the attenuator in response to the receiving input level received by the receiving input level detecting means, the control means varies the attenuation amount of the attenuator in accordance with a received input level detected by the receiving input level detecting means.

Intermediate frequency signal looping means for looping back an intermediate frequency signal in the transmission system to the input of the shifter means is constituted of branching means for taking out a signal from the intermediate frequency band region in the transmission system, synthesizing means for inputting a loop transmission signal to the intermediate frequency band region in the receiving system, and an attenuator inserted between the branching means and the synthesizing means. In this case, the loop intermediate frequency signal is derived from the branching means, attenuated by the attenuator, and then looped back to the input of the shifter means via the synthesizing means.

Moreover when a least one of the branching means and the synthesizing means in the intermediate frequency signal looping means is constituted as a change-over switch, it is changed at a normal transmission/receiving time or a loop testing time.

Moreover, in the intermediate frequency looping means, the attenuator is constituted as a variable attenuator. The testable radio transmitter/receiver includes receiving input level detecting means for detecting a receiving input level, and control means for controlling the attenuation amount of the attenuator in response to the receiving input level detected by the receiving input detecting means. The control means varies the attenuation amount of the attenuator in the intermediate frequency signal looping means in accordance with the receiving input level detected by the receiving input level detecting means.

The shifter means is constituted of transmission signal shifter means for converting the transmission signal converted to the intermediate frequency band by the receiving frequency converting means into the receiving input frequency of the modulator/demodulator; by-pass means for by-passing said transmission signal shifter means; and selecting means for inputting selectively the output of the receiving frequency converting means to either the transmission signal shifter means or the by-pass means. Switching means can be arranged so as to derive a signal from either transmission signal shifter means or the by-pass means in cooperation with the selecting means. In this case, both the selecting means and the switching means are switched to the by-passing means at a normal operation time and switched to the transmission signal shifter means at a loop testing time.

The shifter means is constituted of a first frequency converting local oscillator at a normal operation time, a second frequency converting local oscillator at a loop operation time, switching means for selectively outputting the output of the first frequency converting local oscillator and the output of the second frequency converting local oscillator, and a mixer for receiving the output from the switching means and the intermediate frequency signal from the output of the receiving frequency converting means to convert the intermediate frequency signal to the receiving input frequency of the modulator/demodulator. The switching means selects the first frequency converting local oscillator at a normal operation time and selects the second frequency converting local oscillator at a loop operation time.

When being arranged in the modulator/demodulator, control means transmits to a distant communication office a command for halting a transmission from the distant communication office to an intra-office at a loop testing time.

The shifter may be constituted of a dc power supply used for a normal operation time, frequency converting local oscillator used for a looping time, a switching means for selectively outputting the output of the dc power supply and the output of the frequency converting local oscillator, and a mixer for receiving the output from the switching means and an intermediate frequency signal from the receiving frequency converting means to convert the intermediate frequency signal to the receiving input frequency converting means of modulator/demodulator. In this case, at the normal operation time, the mixer receives the output of the dc power supply selected by the switching means but does not execute its frequency conversion. At the loop testing time, the switching means selects the frequency converting local oscillator.

The switching means may be constituted of a hybrid circuit between the dc power supply and the frequency converting local oscillator, and the mixer; a first dc switch inserted between the dc power supply and the hybrid circuit; a second dc switch inserted between the frequency converting local oscillator and a dc power supply for supplying a drive electric power to the same; and control means. At the normal operation time, the control means turns on the first dc switch while turning off the second dc switch. At the loop testing time, the control means turns off the first dc switch while turning on the second dc switch. Therefore, at the normal operation time, the control means outputs the output of the dc power supply to the mixer via the hybrid circuit. At the loop testing time, the control means outputs the output from the frequency converting local oscillator to the mixer via the hybrid circuit.

The bias T-circuit acting as the hybrid circuit can reduce the passage loss between the frequency converting local oscillator and the mixer.

Furthermore, the frequency converting local oscillator acts as a frequency synthesizer and control means for controlling the oscillation frequency of the frequency synthesizer in accordance with the transmission frequency of the transmission signal in the transmission system is arranged. When the transmission frequency of the transmission signal in the transmission system is changed to a set value, the control means controls the oscillation frequency of the frequency synthesizer.

As described above, according to the loop testable radio transmitter/receiver of the present invention, shifter means is arranged to the output of the receiving frequency converting means in the receiving system and can realize a RF looping function to separate a failed device in a simplified configuration, whereby a miniaturized radio transmitter/receiver can be provided at lower price. Since periodic maintenance inspection and fault separating procedure can be performed easily and rapidly, there is an advantage in economical system configuration and improved reliability.

If the branching means and/or the synthesizing means are used as a change-over switch to loop the RF signal, the adverse effect due to the transmission signal during normal operation can be eliminated.

The fault of the filter means can be inspected by looping the RF signal from the output of the transmission filter means to the input of the receiving filter means.

The use of the transmit/receive sharing means as the RF signal looping system and the utilization of the leakage transmission RF signal from the transmit/receive sharing means can omit an attenuator and a splitter or a synthesizer (including a change-over switch), thus leading to its simplified circuit configuration.

An on/off switch cuts the receiving RF signal at the RF signal looping operation time and can prevent certainly the receiving signal at a high level from affecting adversely to the AGC system in the rear stage at the loop testing time.

An externally controllable variable attenuator used as an attenuator can perform the dynamic operational inspection of the equipment by varying the attenuation amount during the loop testing time. In concrete, since the attenuator can control equivalently the receiving input level of the equipment to obtain the error rate characteristics to the receiving input level, the condition of the equipment can be inspected in more detail.

Since the addition of the intermediate frequency signal looping means can loop back the IF signal at the input side of the equipment, a failed IF component or RF component in the equipment can be separated, whereby the IF cable in abnormal state coupling between the modulator/demodulator and the radio device can be advantageously detected.

The use of the double conversion system which modulates a receiving IF frequency twice in frequency enables a separation of a failed component, a miniaturization and reduced cost of the equipment without impairing the RF looping function.

Control means may be arranged to the modulator/demodulator of an intra-office to transmit to a distant communication office a command for halting the transmission frown the distant communication office to the intra-office during the loop testing time. In this configuration, since there is no receiving RF signal to the intra-office but only a loop transmission RF signal, the receiving level variations due to weather does not affect the AGC system.

In the shifter means, switching means inputs the output of the dc power supply at a normal operation time and the output of the frequency converting local oscillator at a loop testing time and is connected to a mixer which converts an intermediate frequency signal from the receiving frequency converting means into an receiving input frequency signal. The mixer is switched at a normal operation time or a loop testing time and passes the receiving signal at the normal operation time as well as the looping signal of the RF signal at the loop testing time. Since there is no difference between the receiving system level diagrams at the normal operation time and the loop testing time, a performance evaluation and self-diagnosis can be performed accurately. No switching procedure to a special component in the receiving system being switching means such as the RF switch during the loop testing time contributes to a reduced cost. The loop testing inability due to a failed RF switch leads to an improved reliability.

Since the control means controls changeably the first dc switch between the dc power supply and the hybrid circuit and the second dc switch for turning on/off the dc drive electric power to the frequency converting local oscillator, a changeover at the normal operation time and the loop testing time can be switched by using only dc switches with high reliability and at low price. As a result, simplified equipment structure, reduced cost, and improved reliability can be realized.

A bias T-circuit working as the hybrid circuit can decrease the passage loss between the frequency converting local oscillator and the mixer, thus enabling use of a frequency converting local oscillator with low output power, low power consumption, and leading to a reduced cost.

A frequency synthesizer may be used as the frequency converting local oscillator and the oscillation frequency is controlled in accordance with the frequency of a transmission signal in the transmission system. Thus even if the frequency of the transmission signal in the transmission system is changed to a set value, the oscillation frequency of the synthesizer can be controlled in accordance with the change. Effectively, at the loop testing time, the intermediate frequency signal from the received oscillation converting means can be set always to a fixed receiving input frequency signal by a mixer.

DESCRIPTION OF THE PREFERRED EMBODIMENTS

Referring to the attached drawings, an explanation will be made in detail as for preferred embodiments of the radio transmitter/receiver according to the present invention.

(a) Explanation of the First Embodiment

Figure 1:
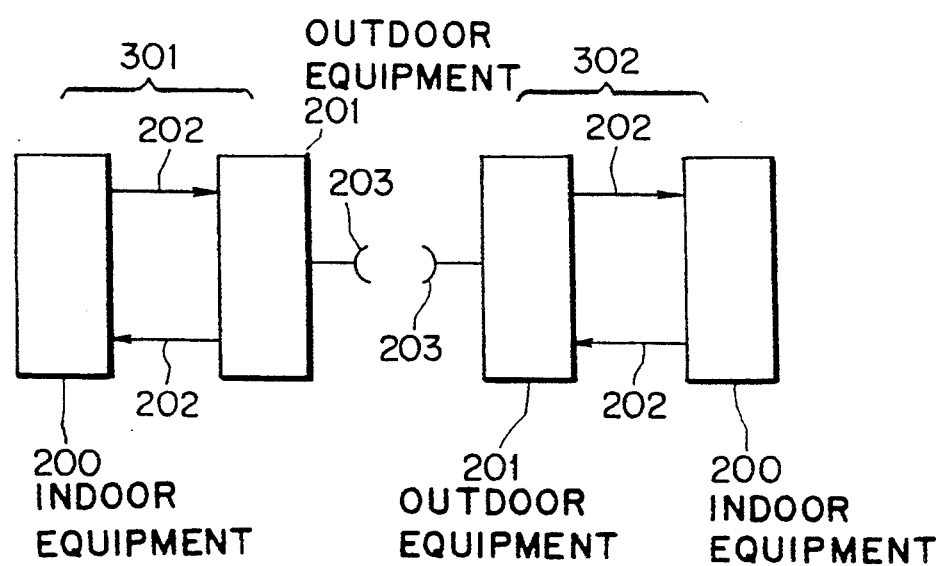
FIG. 1 is a block diagram showing a radio communication system having a loop testable radio transmitter/receiver according to the first embodiment of the present invention.

FIG. 1 is a block diagram showing a radio communication system including a loop testable radio transmitter/receiver according to the first embodiment of the present invention. In FIG. 1, numerals 301 and 302 represent offices or stations. The office 301 represents an intra-office and 302 represents a distant communication office.

In each of offices 301 and 302, an indoor equipment 200 including a modulator/demodulator is connected to an outdoor equipment 201 by way of IF cables 202. The outdoor equipment includes an up-converter, a transmission filter, a down converter, a receiving filter, and a transmit/receive sharing unit. A transmit/receive antenna 203 is equipped to the outdoor equipment 201.

Figure 2:
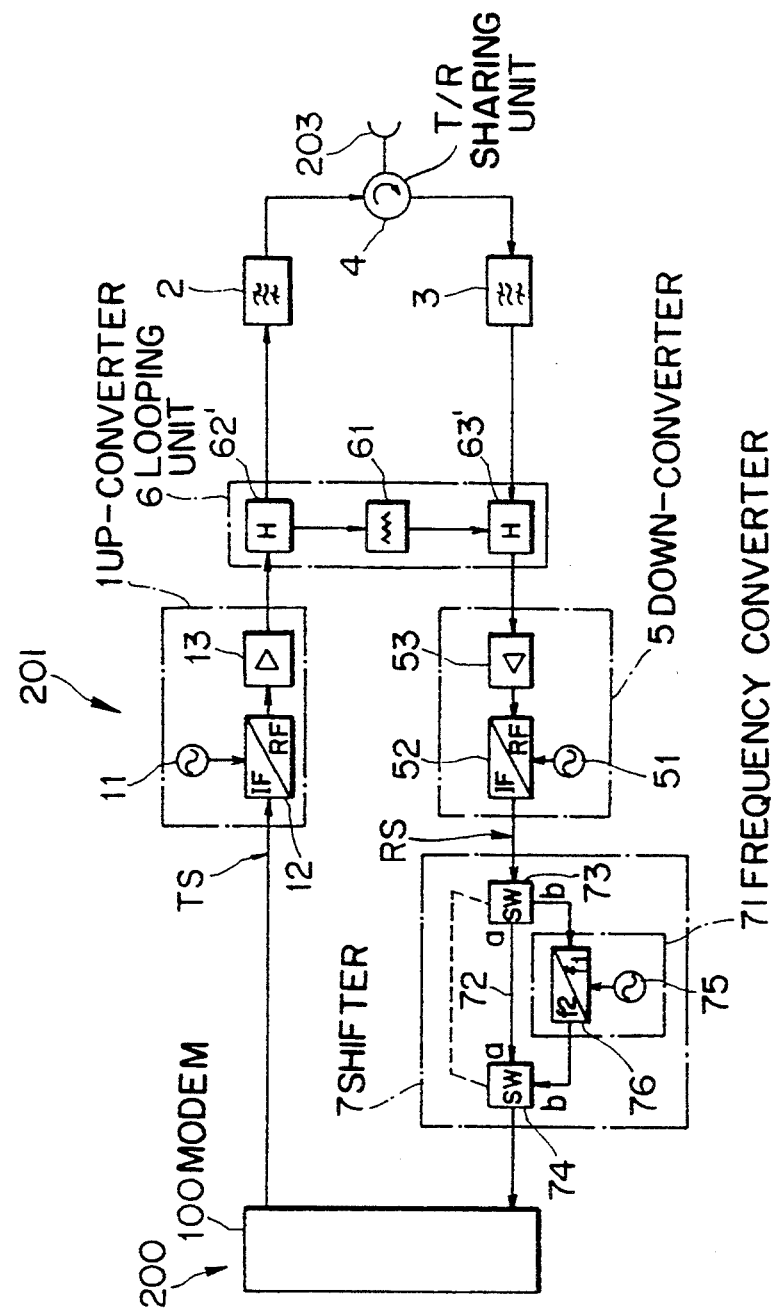
FIG. 2 is a block diagram showing the first embodiment according to the present invention.

The outdoor equipment 201 at the intra-office 301 is constituted as a loop testable radio transmitter/receiver. The outdoor equipment 201 at the intra-office 301, as shown in FIG. 2, is constituted of a transmission system TS, a receiving system RS, a transmit/receive sharing unit (transmit/receive sharing means) 4, transmission signal looping unit (transmission signal looping means (RF LOOP)) 6, and a shifter (shifter means) 7.

The transmission system TS is formed of an up-converter (transmission frequency converting means (TCONV)) 1 and a transmission filter (transmission signal filtering means (TBF)) 2. The up-converter 1 converts a transmission intermediate frequency signal (transmission IF signal) from the modulator/demodulator (MODEM) 100 into a transmission frequency signal (transmission RF signal with a frequency of fT) and is formed of a local oscillator 11, a mixer 12, and a high-power amplifier (HPA) 13.

The transmission filter 2 suppresses an undesired wave including a transmission frequency signal from the up-converter 1 and is formed of a band pass filter.

The receiving system RS includes a receiving filter (receiving signal filtering means (RBF)) 3 and a down-converter (receiving frequency converting means (RCONV)) 5. The receiving filter 3 suppresses an undesired wave including a receiving frequency signal (receiving RF signal with a frequency of fR) and is formed of a band pass filter.

The down-converter 5 converts a signal from the receiving filter 3 into a receiving intermediate frequency signal (receiving IF signal with a frequency fRIF) for the modulator/demodulator unit 100 and includes a local oscillator 51, a mixer 52, and a low noise amplifier (LNA) 53.

The transmit/receive sharing unit 4 outputs a transmission signal from the transmission system TS to the antenna 203 and sends a receiving signal from the antenna 203 to the receiving system RS. The transmission signal looping unit 6 attenuates a transmission signal from the transmission system TS and loops back to the receiving system RS. The transmission signal looping unit 6 includes an attenuator 61, an splitter (branching means) 62', and a synthesizer (synthesizing means) 63'.

The attenuator (resistor) 61 is arranged between the splitter 62' and the synthesizer 63' and attenuates the loop signal to the same level as that of the receiving signal.

Figure 3:
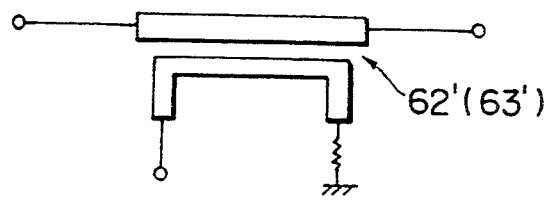
FIG. 3 is a structural diagram of a splitter component or a synthesizer component.

The splitter 62' derives a transmission signal from the transmission frequency band region in the transmission system TS. The synthesizer 63' inputs a loop transmission signal to the receiving frequency band region in the receiving system RS. The splitter 62' and the synthesizer 63', as shown in FIG. 3, is constituted as a hybrid circuit having a directional coupler.

The splitter 62' and the synthesizer 63' may be a conventional directional coupler having a small coupling degree, in consideration of the attenuation by the attenuator 61, whereby the transmission signal looping unit 6 can be realized using a simplified micro-strip line.

In this case, the device unit fault separation should be performed by looping back at a spot closer to the output of the equipment. Looping back the radio transmitter/receiver is necessarily performed in the RF band. Hence, the transmission signal looping unit 6, as shown in FIG. 2, structurally loops back from the output of the high-power amplifier 13 to the input of the low noise amplifier 53.

The shifter 7 is arranged to the output of the down-converter 5 of the receiving system RS and converts a signal in an intermediate frequency band converted by the down-converter 5 into a receiving input frequency of the modulator/demodulator 100. The shifter 7 includes a frequency converter (transmission signal shifter means) 71, a by-pass route (by-passing means) 72, change-over switch (selecting means) 73, and change-over switch (change-over switching means) 74.

The frequency converter 71 converts a transmission signal (of a frequency of fTIF) in the intermediate frequency band converted by the down-converter 5 into a receiving input frequency fTIF' of the modulator/demodulator 100. The frequency converter 71 includes a local oscillator 75 and a mixer 76.

Figure 4:
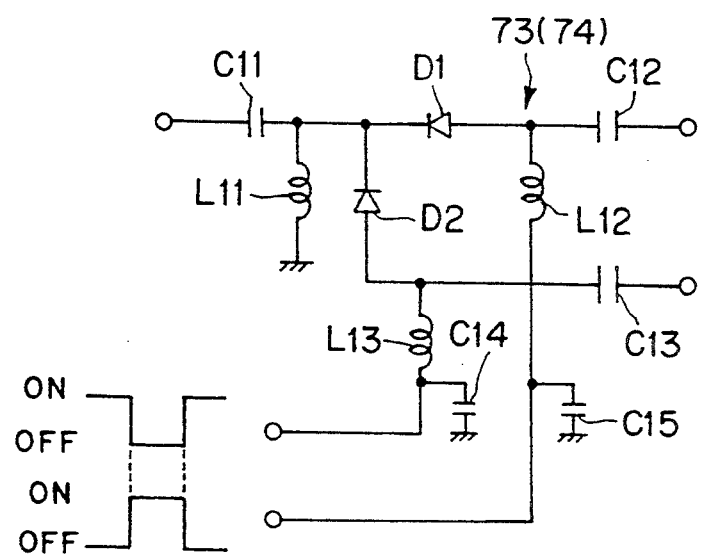
FIG. 4 is a circuit diagram showing a change-over switch.

The by-pass route 72 is a signal passage for by-passing the frequency converter 71. The change-over switch 73 inputs selectively the output of the down-converter 5 to either the frequency converter 71 or the by-pass route 72. The change-over switch 74 derives a signal from the frequency converter 71 or the by-pass route 72 in cooperation with the change-over switch 73. Diodes D1 and D2, as shown in FIG. 4, are used as the change-over switches 73 and 74, respectively. In FIG. 4, C11 to C13 are dc-cut capacitors, C14 to C15 are capacitors, and L11 to L13 are coils. Pulses with a repulsive phase are applied through the coils L11 and L12. When receiving a high level signal, the diode D1 is conductive. When receiving a high level signal, the diode D2 becomes conductive.

In the above structure, the up-converter 1 frequency-converts the transmission IF signal from the modulator/demodulator 100 to a transmission RF signal. Then the high power amplifier 13 amplifies the transmission RF signal to a desired transmission output level. The transmission filter 2 suppresses an undesired wave of the local oscillating signal component from the amplified RF signal and the resultant signal is supplied to the feeding terminal of the antenna 203 through the transmit/receive sharing unit 4.

On the other hand, the low level receiving RF signal is separated from the transmission signal by the transmit/receive sharing unit 4 and a undesired wave is suppressed by the receiving filter 3. Then the resultant signal is amplified sufficiently by the low noise amplifier 53 and frequency-converted to a receiving IF signal by the down-converter 5. At a normal state, since the change-over switches 73 and 74 are at the side a, the receiving IF signal (of frequency fRIF) is supplied without any change to the demodulator of the modulator/demodulator 100 through the by-pass route 72.

Moreover, the splitter 62' receives the transmission RF signal (of a frequency of fT) from the high-power amplifier 13 and the attenuator 61 attenuates a part of the RF signal to issue a loop signal to a desired level. The loop signal is synthesized with a receiving RF signal (of a frequency of fR) by the synthesizer 63' to provide the outcome to the low noise amplifier 53.

The transmission RF signal (of a frequency of fT) and the receiving RF signal (of a frequency of fR) are frequency-converted into IF signals by the down-converter 5 (while the frequency of the receiving IF signal is fRIF and the frequency of the loop transmission IF signal is fTIF).

Since the change-over switches 73 and 74 are changed to the sides b at the RF loop testing time, the frequency converter 71 converts each of the IF signals to the second IF frequency fTIF' in accordance with the local oscillator 75 for shifting. By selecting the frequency fTIF' to the frequency fRIF at the shifting time, the shifting local oscillator 75 can supply a signal of a frequency fTIF'(=fRTF) as an input signal to the demodulator in the modulator/demodulator 100, whereby a transmission signal can be reproduced through the RF loop, as shown in the conventional art.

Figure 5:
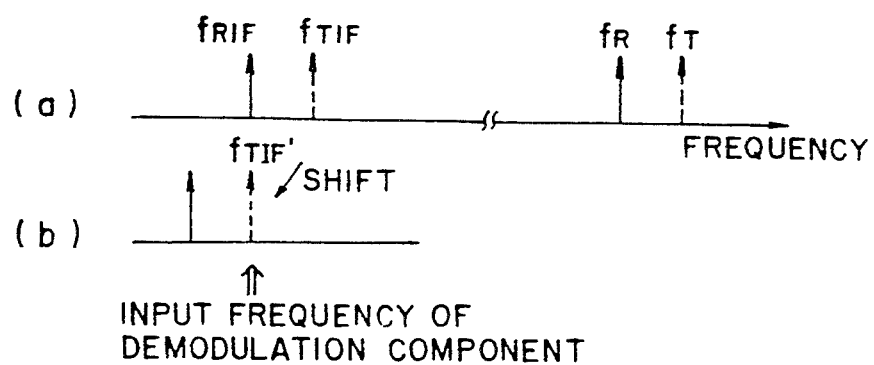
FIG. 5 is an explanatory diagram showing the frequency conversion principle of a receiving system.
Figure 28:
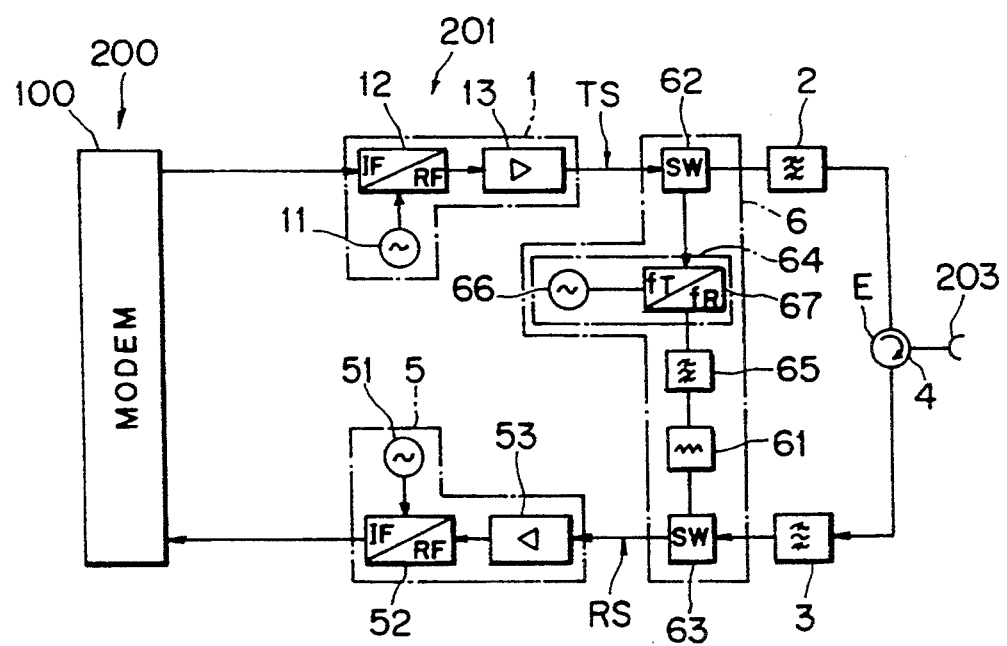
FIG. 28 is a block diagram showing a loop testable radio transmitter/receiver.

For example, FIG. 5 shows the relationships between the frequency fTIF of a loop transmission IF signal, the frequency fTIF' of a loop transmission IF signal after conversion, the frequency fRIF of a receiving IF signal, the frequency fT of a transmission RF signal, and the frequency fR of a receiving RF signal. These figures indicate that the intermediate frequency band of the down-converter 5 is set to a wider value than that of the down-converter 5 shown in FIG. 28.

According to the present embodiment, the down-converter 5 inputs a part of the transmission RF signal together with the receiving RF signal (of a frequency of fR) and makes as signals of frequencies fTIF and fRIF. In a normal operation, the down-converter 5 converts a receiving RF signal to the receiving IF frequency fRIF for the modulator/demodulator 100. In a RF looping operation, the frequency converter 71 is selected by the change-over switches 73 and 74 and converts in frequency the frequency fTIF of the loop transmission IF signal to the receiving IF frequency fTIF'(=fRIF) for the modulator/demodulator 100. Hence the transmission signal (of a frequency of fT) looped back in the RF band can be certainly demodulated by the modulator/demodulator 100.

The transmission RF signal looping circuit 6 can be formed of a simplified circuit including an attenuator 61, a splitter 62', and a synthesizer 63'. Since the transmission signal is shifted in the intermediate frequency band, the circuit forming the change-over switches 73 and 74 and the frequency converting unit 71 can be made at very low price in comparison with the conventional circuit shifting in the RF band. The shift unit 7 can be mounted together with other circuits on a single printed board so that the whole device is miniaturized.

Figure 6:
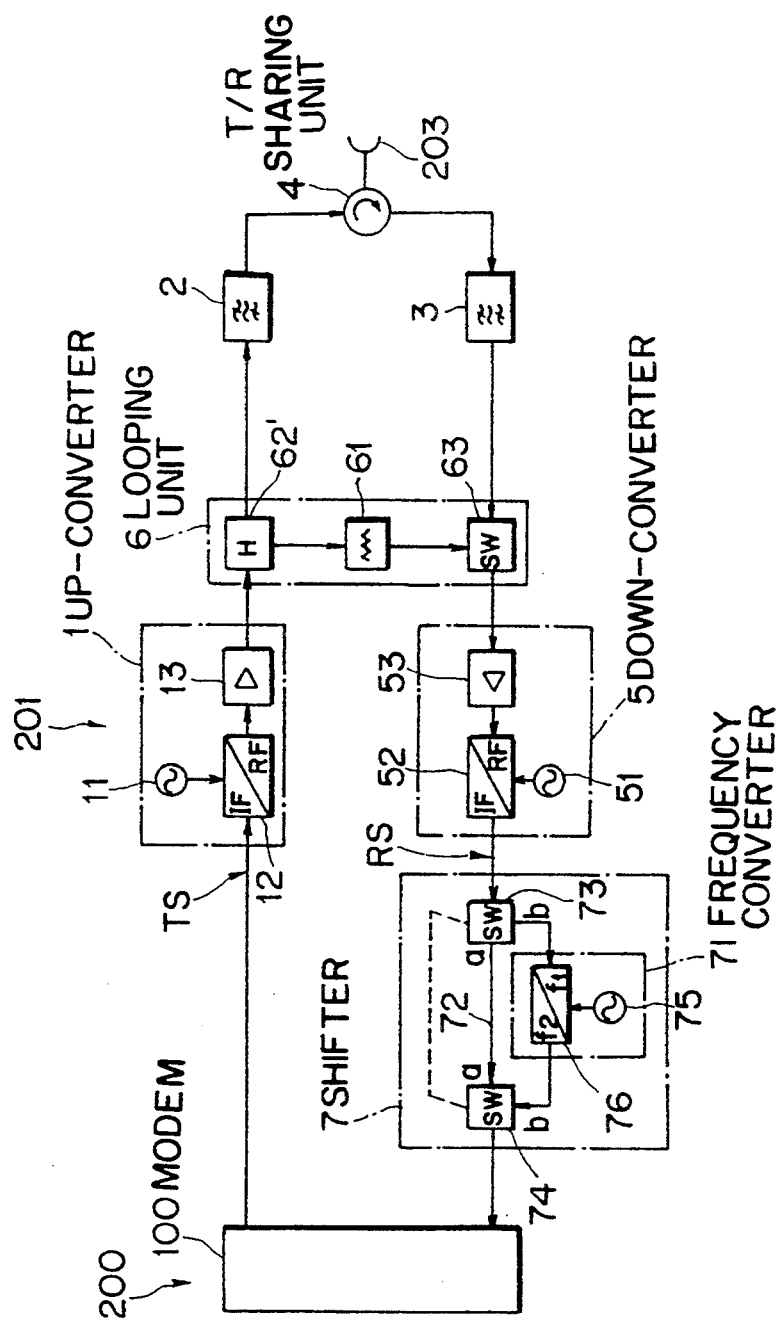
FIG. 6 is a block diagram showing a first modified example according the first embodiment of the present invention.
Figure 29:
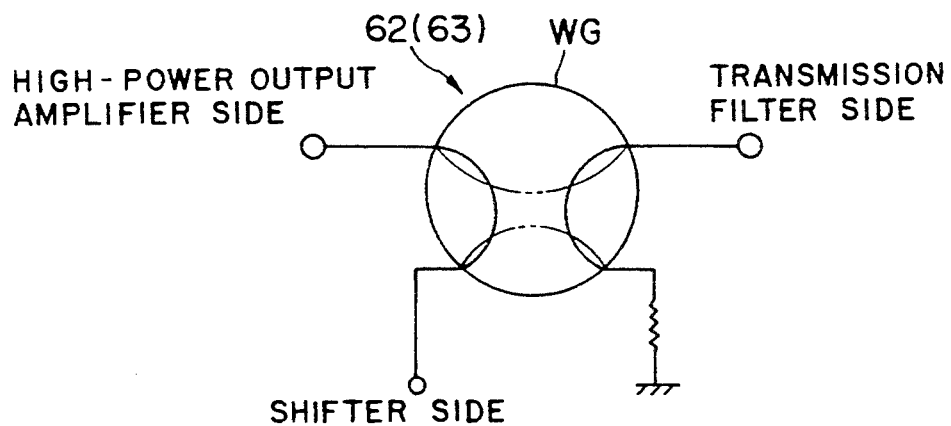
FIG. 29 is a structural diagram showing a change-over switch in a loop component.
Figure 30:
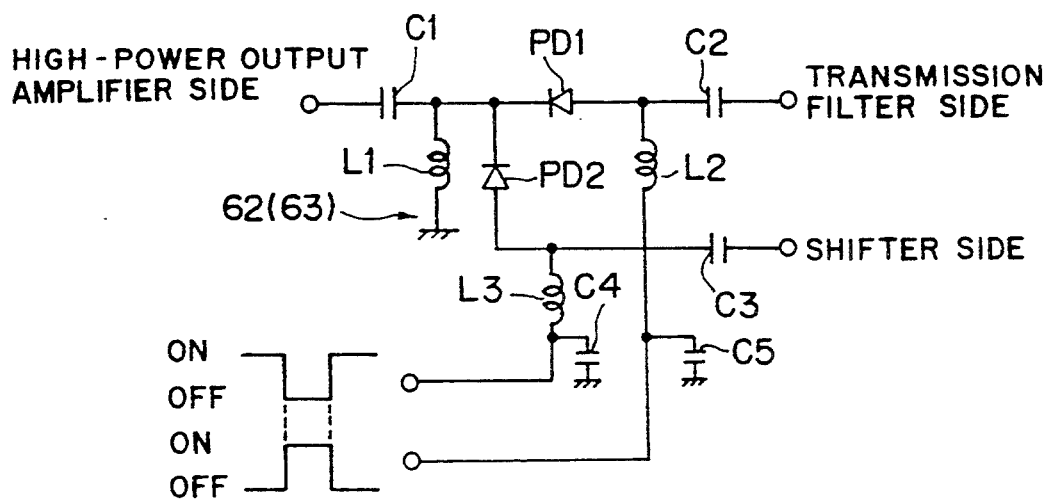
FIG. 30 is a circuit diagram showing the configuration of a change-over switch in a loop component.
Figure 31:
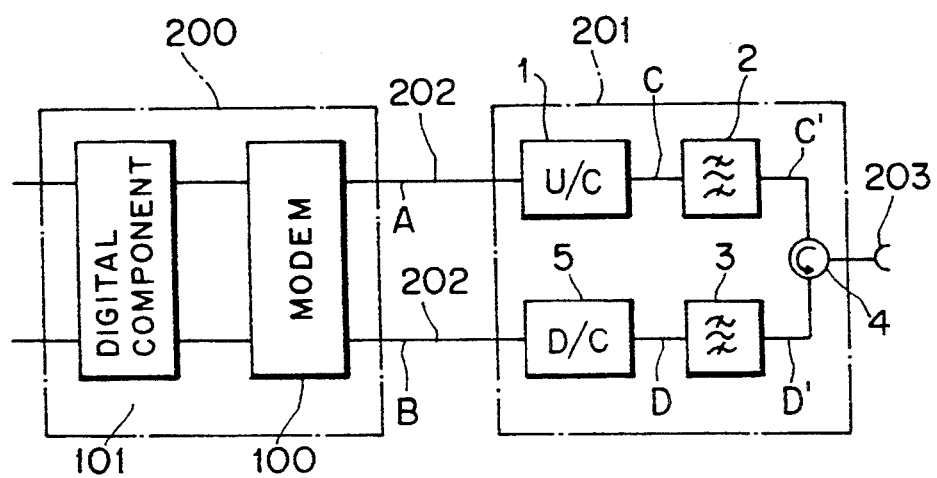
FIG. 31 is a diagram showing a conventional radio transmitter/receiver.

The above embodiment uses the splitter 62' and the synthesizer to loop back the RF signal. However, at least one of the splitter 62' and the synthesizer 63' may be constituted as a change-over switch to remove an adverse effect due to the transmission signal at a normal operation time. FIG. 6 shows the example where a change-over switch 63 is used instead of the synthesizer 63' shown in FIG. 2. This structure can remove the influence due to noises and receiving signal at the looping time. As a structural example of the change-over switch 63 are used the waveguide WG shown in FIG. 29 and the pin-diodes PD1 and PD2 shown in FIG. 30.

Figure 7:
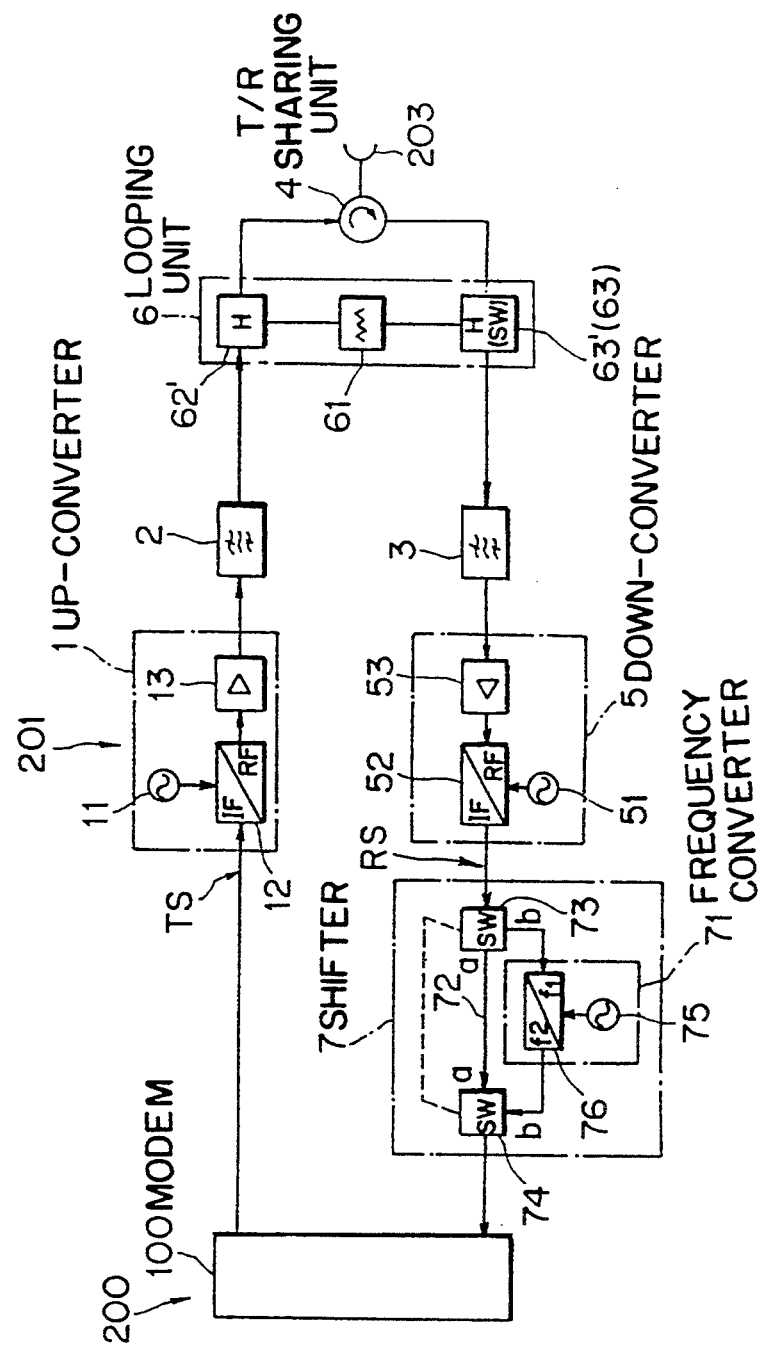
FIG. 7 is a block diagram showing a second modified example according to the first embodiment of the present invention.

In the above embodiment, the RF signal loop starts from the output of the high-power amplifier 13 and returns to the input of the low noise amplifier 53. However, the RF signal loop, as shown in FIG. 7, may start from the output of the transmission filter 2 and may return to the input of the receiving filter 3. In this case, the receiving filter 3 must be considered on the attenuation amount over the transmission band but enables a fault test to the filters 2 and 3.

Figure 8:
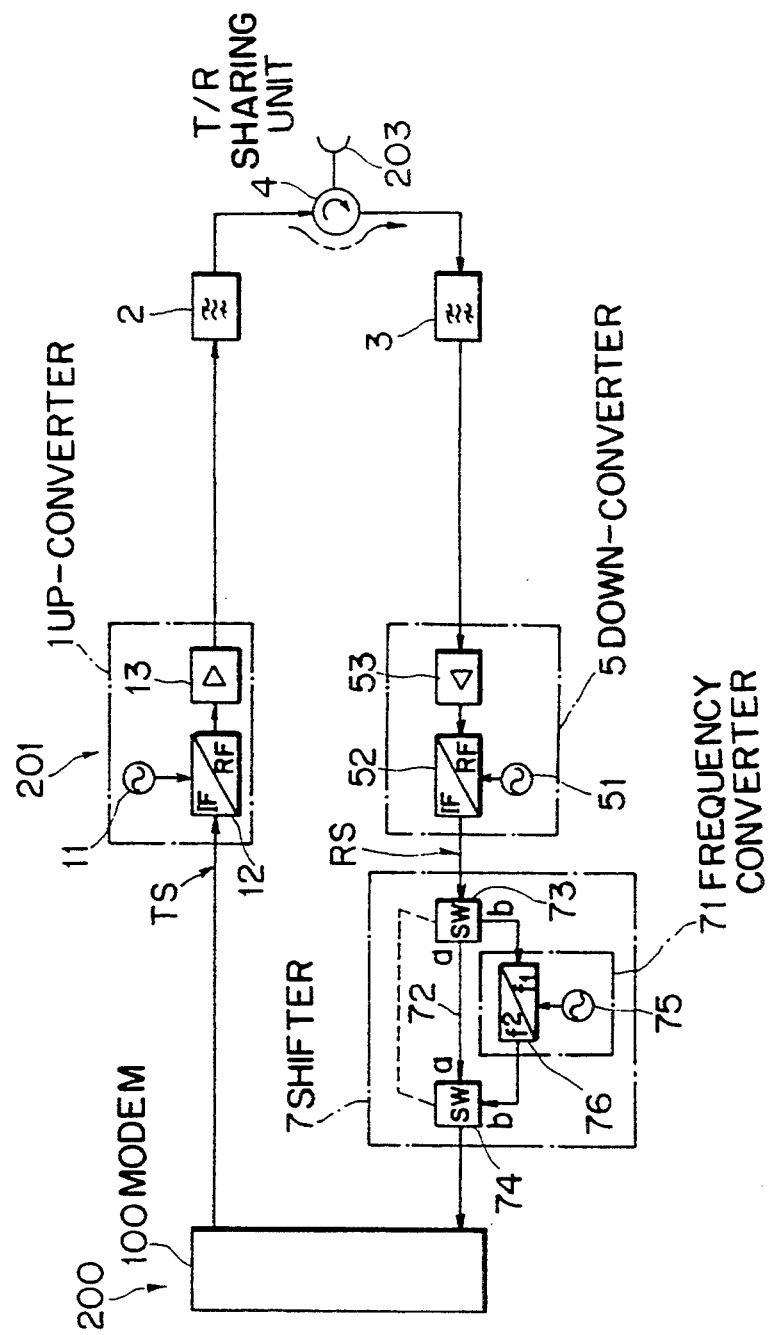
FIG. 8 is a block diagram showing a third modified example according to the first embodiment of the present invention.

The above embodiment employs intentionally a RF signal looping system. However, since the receiving RF level generally is low, the RF signal looping system can be formed by the transmit/receive sharing unit 4 and uses the leakage (refer to dashed lines in FIG. 8) of the transmission RF signal from the transmit/receive sharing unit 4, in consideration to the isolation of the transmit/receive sharing unit 4 and the transmission attenuation amount of the receiving filter 3. This configuration eliminates an attenuator and a splitter or a synthesizer (including a change-over switch), thus resulting in a simplified circuit.

Figure 9:
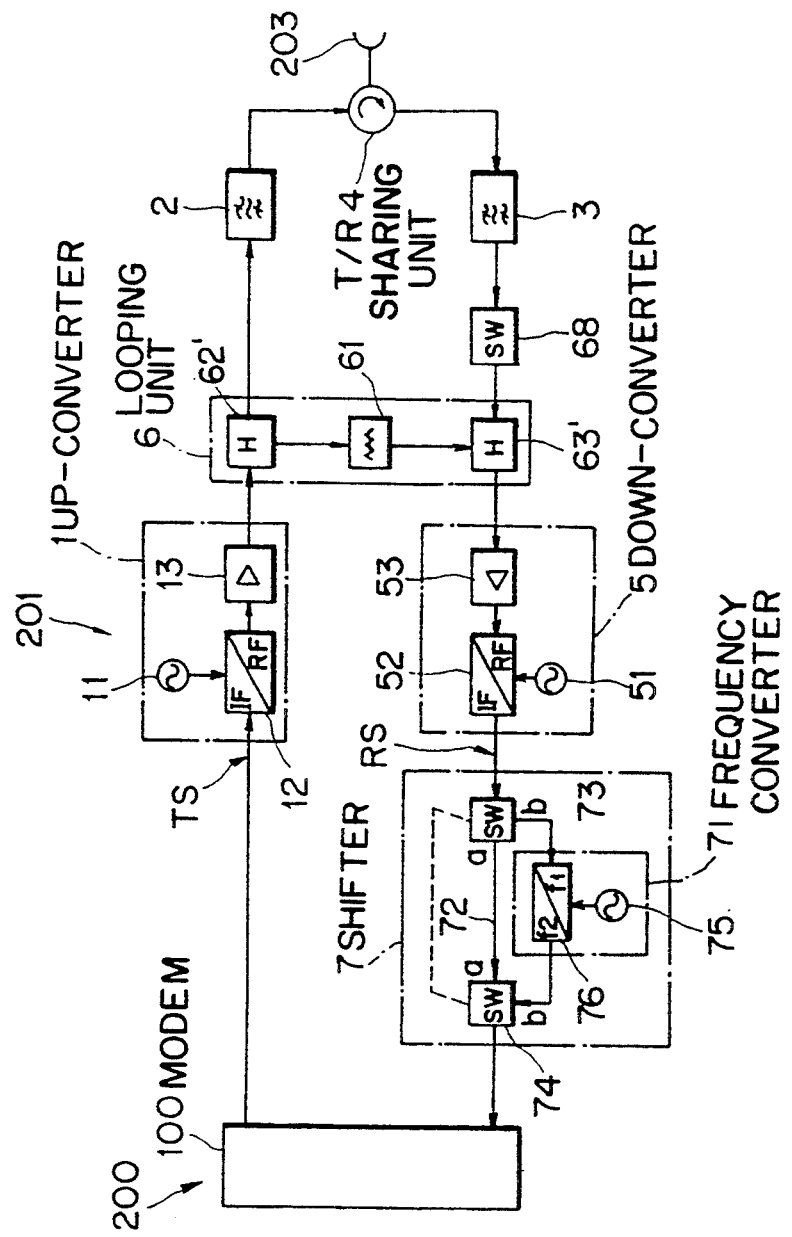
FIG. 9 is a block diagram showing a fourth modified example according to the first embodiment of the present invention.

In the above embodiment, since the receiving RF signal exists at a loop testing time and is at a high level in fine weather, the D/U ratio to the loop signal may affect adversely the AGC system in the rear stage. As shown in FIG. 9, when the on/off switch 68 is OFFed at the RF signal loop time, the receiving RF signal is cut. This configuration is different from the embodiment shown in FIG. 6 in that the switch is a change-over switch or an on/off switch.

Figure 10:
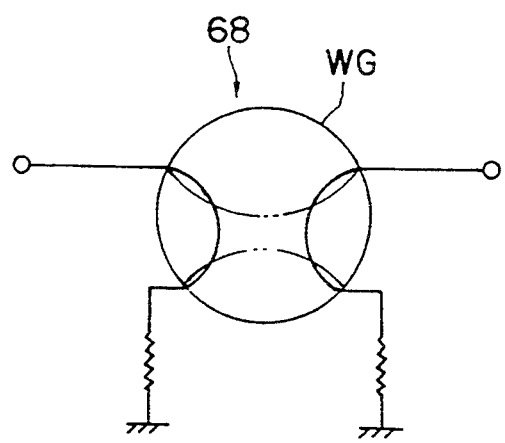
FIG. 10 is a structural diagram showing a change-over switch of the fourth example according to the first embodiment of the present invention.
Figure 11:
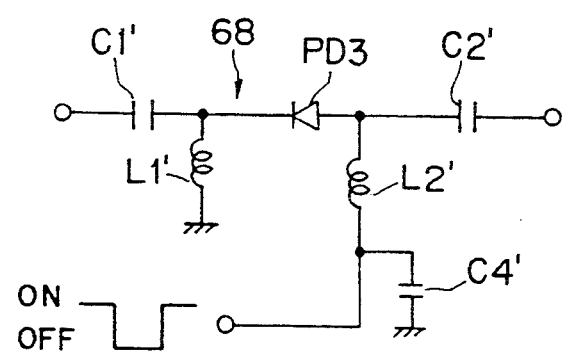
FIG. 11 is a circuit diagram showing the configuration of the change-over switch of the fourth modified example according to the first embodiment of the present invention.

A waveguide WG, as shown in FIG. 10, may be used as the on/off switch 68. A pin-diode PD3, as shown in FIG. 11, may be used as the on/off switch 68. In FIG. 11, C1' and C2' represent dc-cut capacitors, C4' represents a capacitor, and L1' and L2' represent coils. Pulses are produced through the coil L1' to execute on/off control of the switch. When a high level signal is applied, the pin-diode PD3 becomes an on state. When a low level signal is applied, the pin-diode PD3 becomes an off state.

(b) Explanation of the Second Embodiment

Next, a detail explanation will be made regarding the second embodiment according to the present invention.

Figure 12:
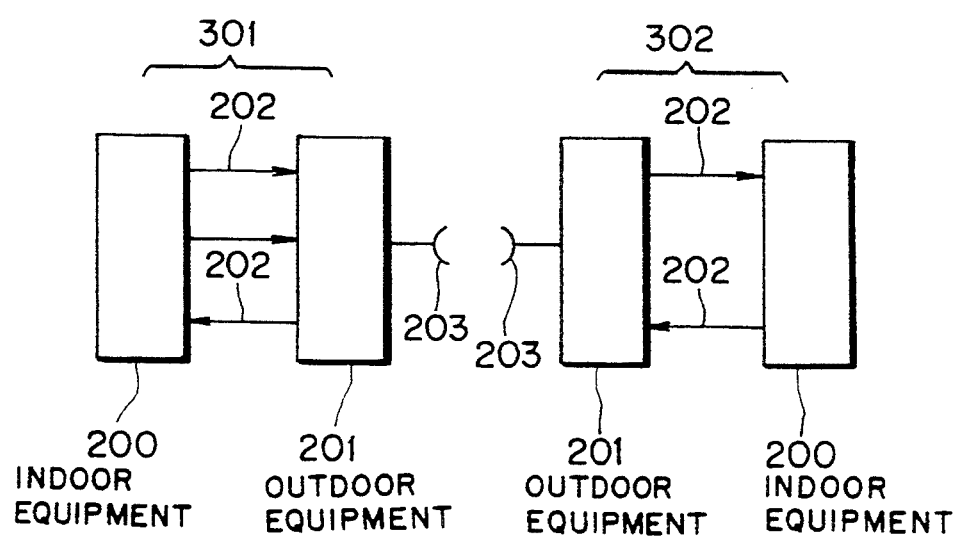
FIG. 12 is a block diagram showing a radio communication system having a loop testable radio transmitter/receiver according to the second embodiment of the present invention.

FIG. 12 is a block diagram showing a radio communication system including a loop testable radio transmitter/receiver according to the second embodiment of the present invention. In FIG. 12, an office 301 is an intra-office and an office 302 is a distant communication office. In the offices 301 and 302, an indoor equipment 200 having a modulator/demodulator is connected to an outdoor equipment 201 having an up-converter, a transmission filter, a down-converter, a receiving filter, and a transmit/receive sharing unit by way of IF cables 202.

Figure 13:
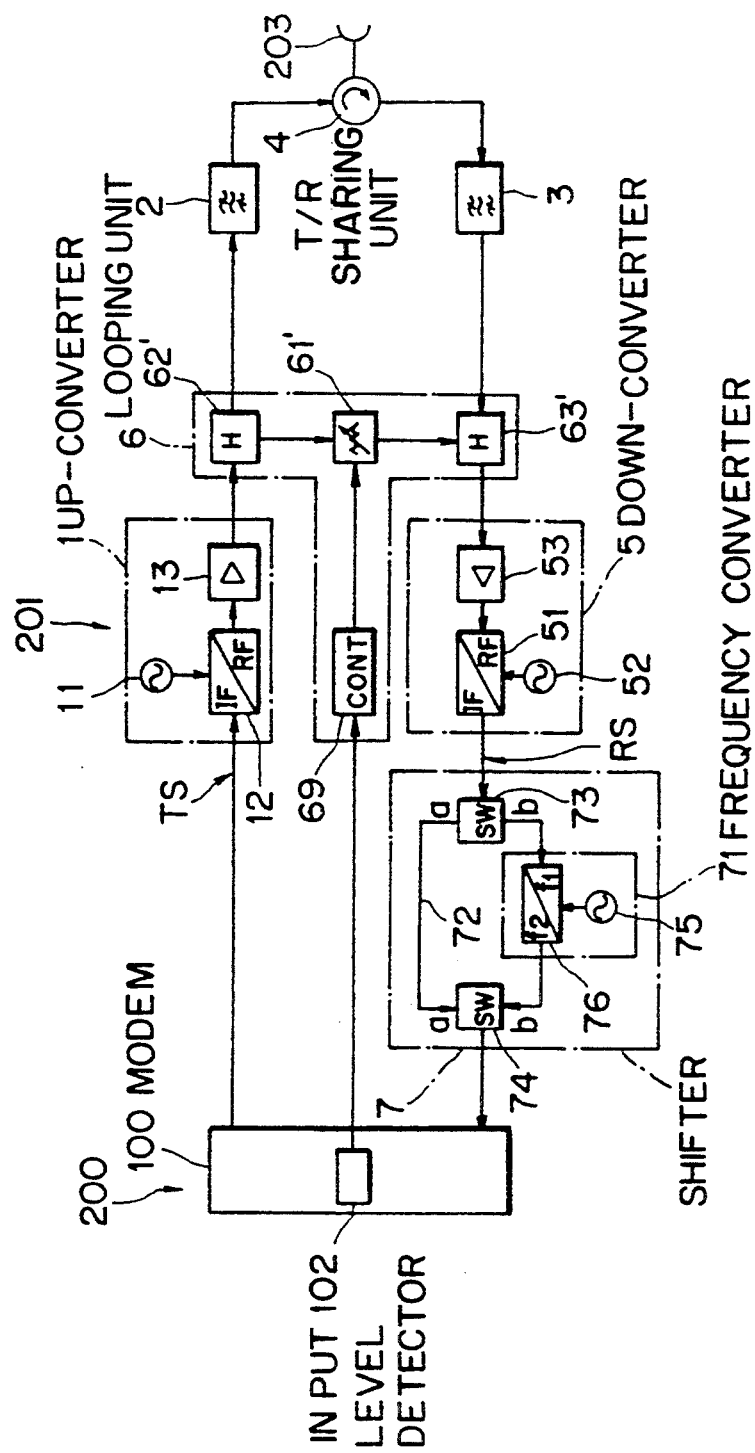
FIG. 13 is a block diagram showing the second embodiment of the present invention.

In the second embodiment, the outdoor equipment 201 in the intra-office 301 is constituted as a loop testable radio transmitter/receiver. The outdoor equipment 201 in the intra-office 301, as shown in FIG. 13, comprises a transmission system TS including an up-converter 1 and a transmission filter 2, a receiving system RS including a receiving filter 3 and a down-converter 5, a transmit/receive sharing unit 4, a transmission signal looping component 6, and a shifter 7.

The transmission signal looping unit 6 attenuates the transmission signal from the transmission system TS and loops back it to the receiving system RS. The looping unit 6 is formed of a variable attenuator 61', a splitter 62', a synthesizer 63' and a control unit (CONT) 69.

The variable attenuator (or variable resistor) 61' is arranged between the splitter 62' and the synthesizer 63' and attenuates the loop signal to the same level as that of the receiving signal. However, the attenuation amount can be varied by adjusting the resistance value.

The splitter 62' and the synthesizer 63' are similar to those used in the first embodiment and are constituted as a hybrid circuit including a directional coupler, respectively.

The control unit 69 controls the attenuation amount of the variable attenuator 61' in accordance with the receiving input level detected by the receiving input level detecting means 102 on the side of the modulator/demodulator 100.

The shifter 7 is arranged to the output side of the down-converter 5 of the receiving system RS and converts the intermediate frequency of a signal converted by the down-converter 5 into a receiving signal frequency of the modulator/demodulator 100. As seen in the first embodiment, the shifter unit 7 includes a frequency converter 71, a by-pass route 72, and change-over switches 73 and 74.

The second embodiment can perform a dynamic operational test to the equipment by varying the attenuation amount of the externally controllable variable attenuator 61 during the loop testing. In concrete, controlling the variable attenuator 61' can vary equivalently the receiving input level of the equipment. Thus since the error ratio characteristic to the receiving input level is obtained, the condition of the equipment can be examined in more detail.

Figure 14:
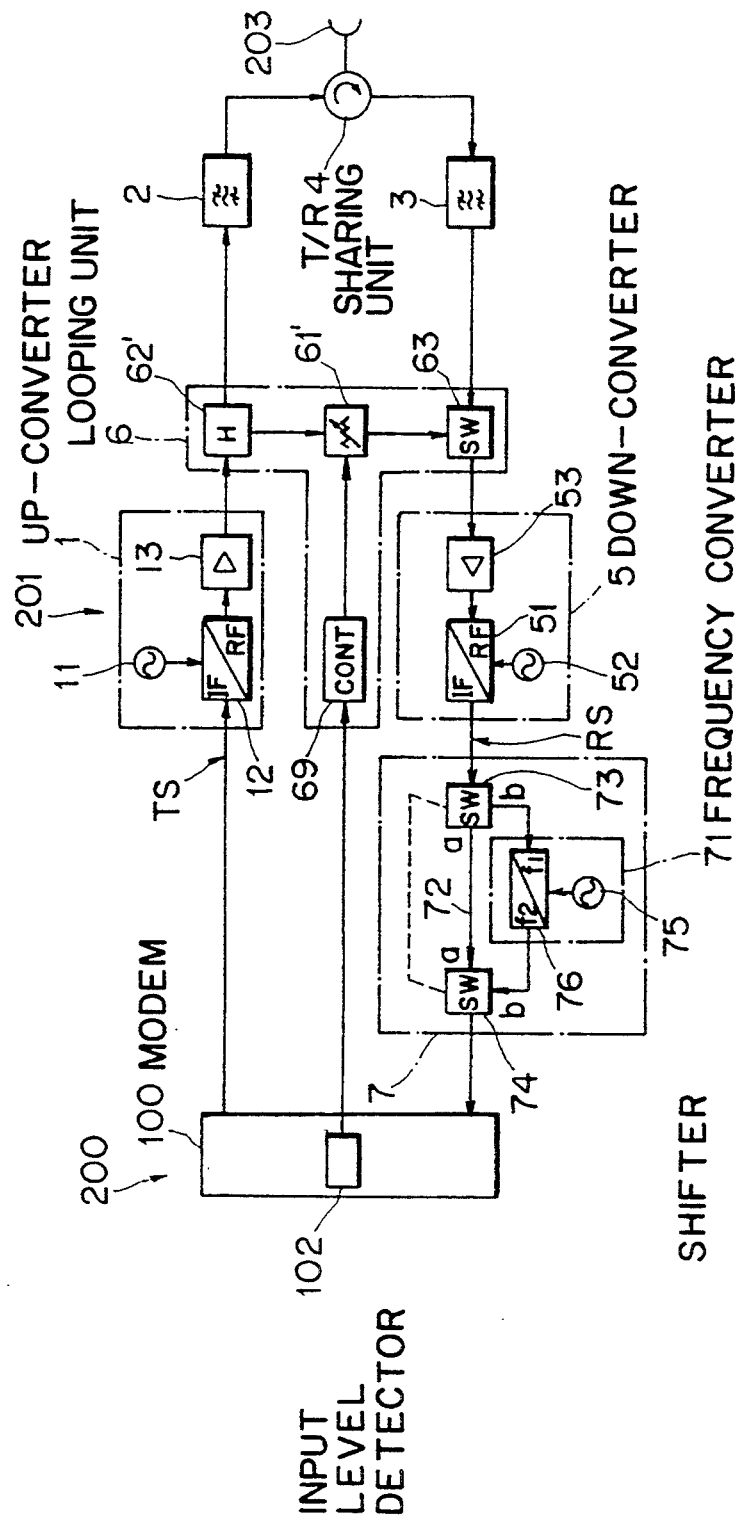
FIG. 14 is a block diagram showing a first modified example according to the second embodiment of the present invention.
Figure 15:
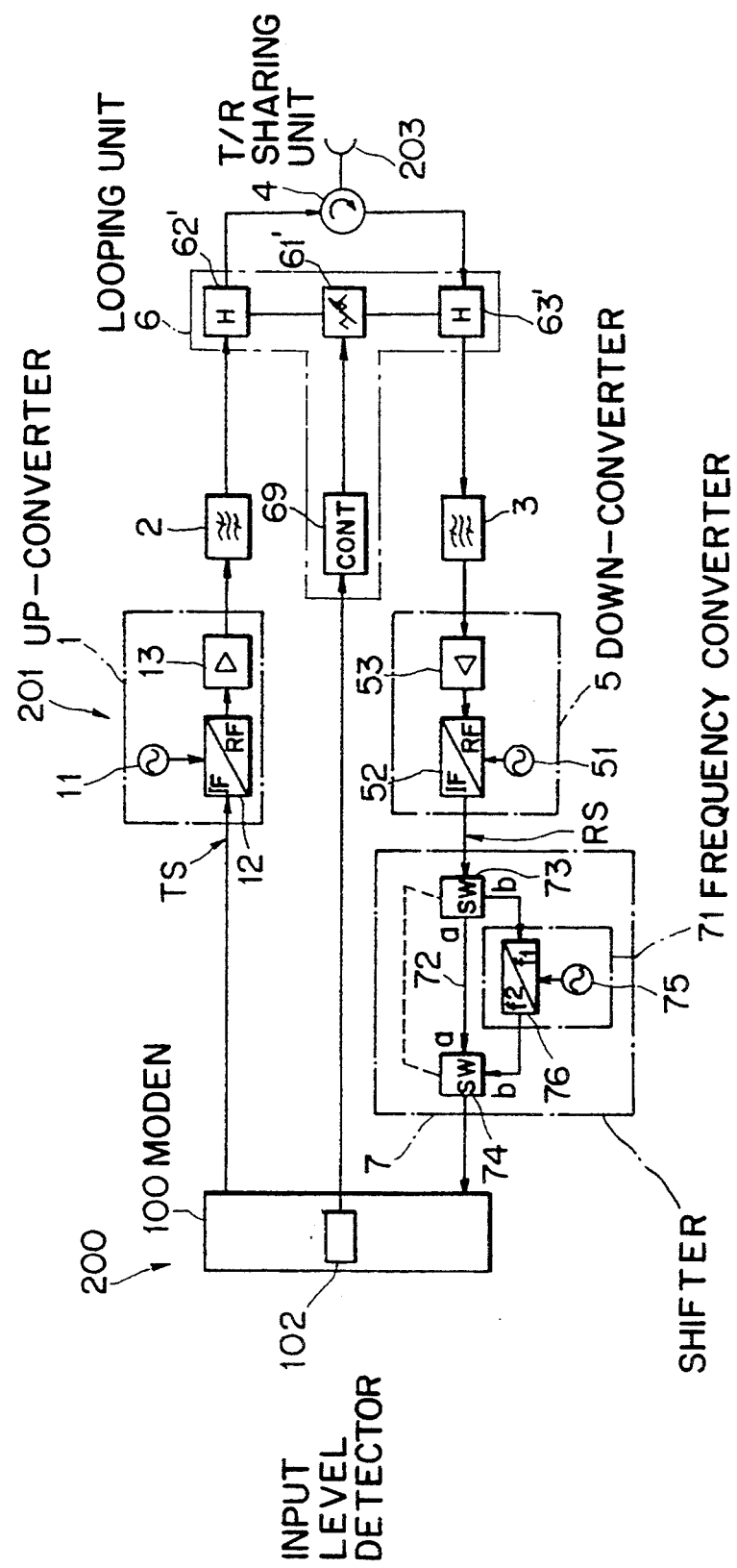
FIG. 15 is a block diagram showing a second modified example according to the second embodiment of the present invention.
Figure 16:
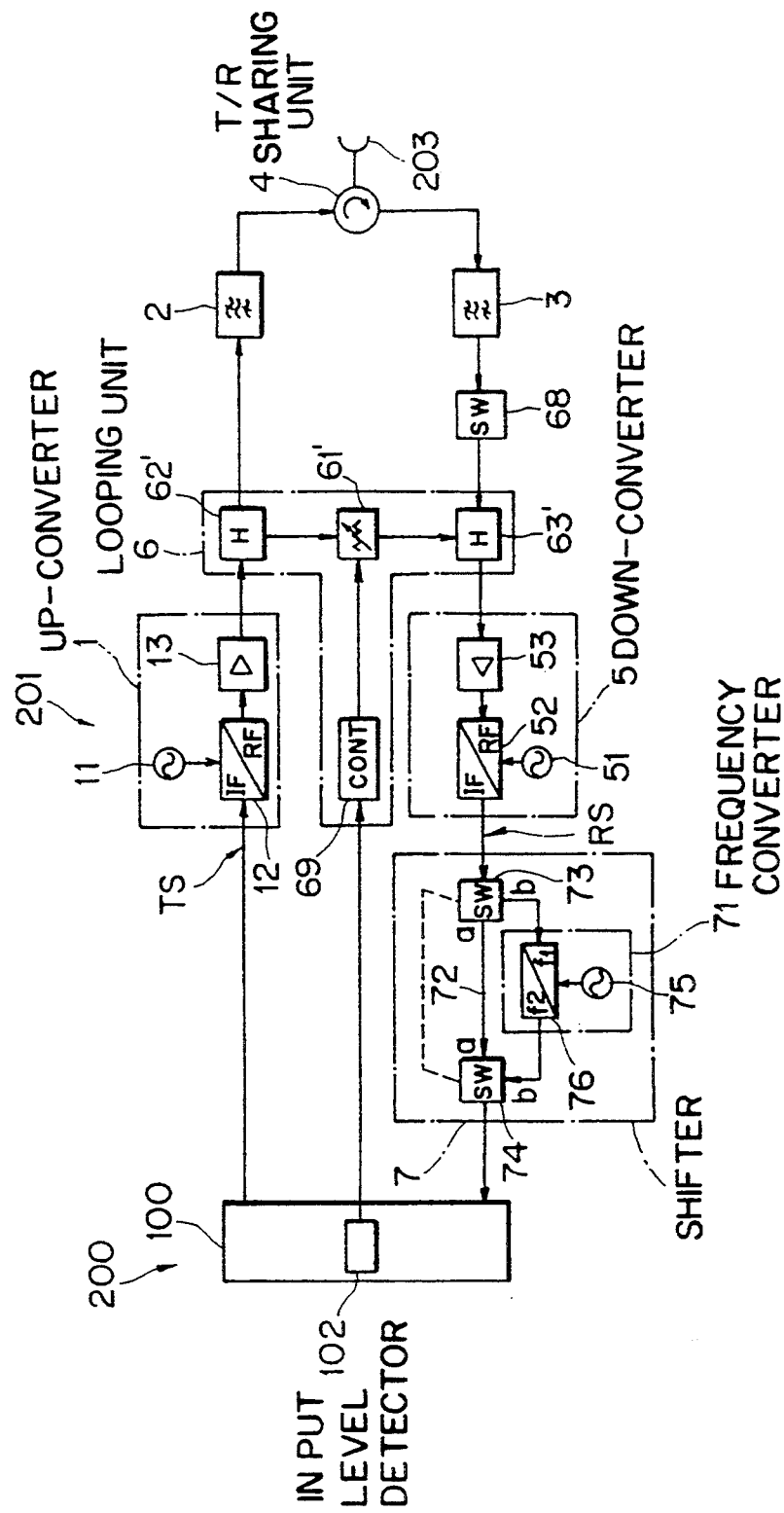
FIG. 16 is a block diagram showing a third modified example according to the second embodiment of the present invention.

In the equipment of the type where the attenuation amount of the attenuator 61' can be varied during the loop testing, both or either of the splitter 62' and the synthesizer 63' can be replaced by a change-over switch 63 (see FIG. 14) to remove an adverse effect due to the transmission signal at a normal operation time. As shown in FIG. 15, the transmission signal looping component 6 can be arranged between the output side of the transmission filter 2 and the input side of the receiving filter 3. As shown in FIG. 16, an on/off switch 68 is arranged in the equipment and the receiving RF signal is cut by turning off the switch 68 at the RF receiving signal loop time.

(c) Explanation of the Third Embodiment

Figure 17:
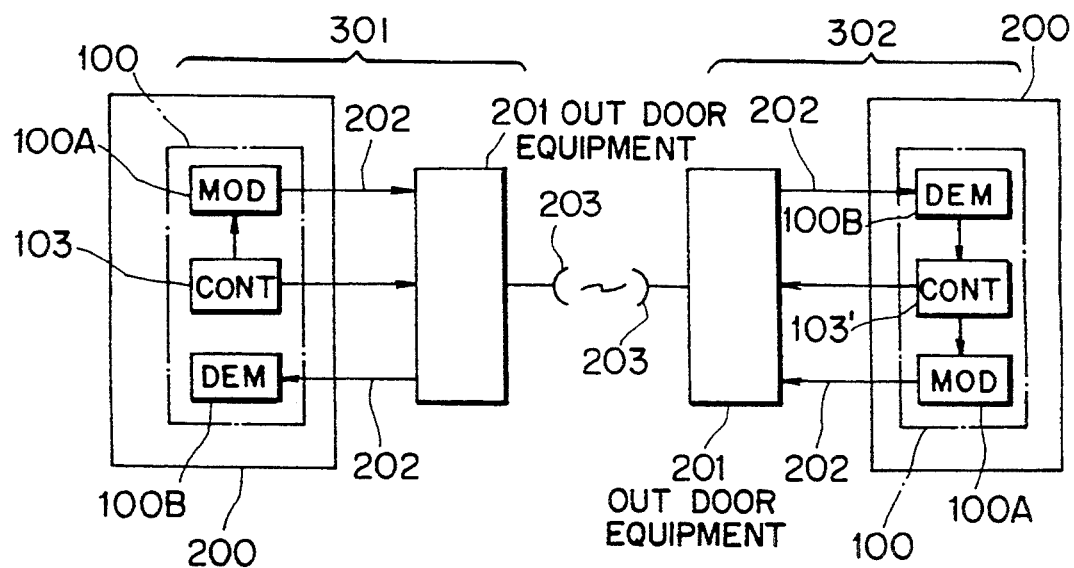
FIG. 17 is a block diagram showing a radio communication system having a loop testable radio transmitter/receiver according to the third embodiment of the present invention.

FIG. 17 is a block diagram showing a radio communication system including a loop testable radio transmitter/receiver according to the third embodiment of the present invention. In FIG. 17, an office 301 is an intra-office and an office 302 is a distant communication office. In the offices 301 and 302, an indoor equipment 200 including a modulator/demodulator 100 is connected to an indoor equipment 201 including an up-converter, a transmission filter, a down-converter, a receiving filter, and a transmit/receive sharing unit by way of IF cables 202.

In the third embodiment, the outdoor equipment 201 at the intra-office 301 is constituted as a loop testable radio transmitter/receiver. The outdoor equipment 201 at the intra-office 301 comprises a transmission system TS including an up-converter 1 and a transmission filter 2, a receiving system RS including a receiving filter 3 and a down-converter 5, a transmit/receive sharing unit 4, a transmission signal looping component 6, and a shifter 7 (refer to FIGS. 2 and 13).

In the third embodiment, a control unit 103 is arranged in the modulator/demodulator 100 in the intra-office 301 and transmits an command to the distant communication office 302 at the loop testing time, the command halting the transmission from the distant communication office 302 to the intra-office 301. The control unit 103' is arranged in the modulator/demodulator 100 in the distant communication device 302 and halts the transmitting operation when a transmission halting command is sent from the the control means 103 of the distant office 301. The modulator/demodulator 100 also includes a modulator 100A and a demodulator 100B.

Therefore, at the RF looping operation, the control unit 103 of the intra-office 301 sends a message to stop transmitting to the distant office 302 via the modulator unit 100A while it sends a RF looping control to the radio apparatus (outdoor equipment) 201 of the intra-office 301.

In the distant office 302, a control signal is derived from the output signal of the demodulator 100B. When receiving a transmission halting command, the control unit 103' issues a transmission halting command to the modulator 100A.

In this case, since the intra-office 301 has no receiving RF signal but a loop transmission RF signal, the AGC system is independent of the receiving level variations due to weather.

After a loop test completion, the equipment returns to the normal state by sending a transmission start command to the distant office 302 from the control unit 103 of the intra-office 301, like that at the transmission halting time.

Figure 18:
FIG. 18 is an explanatory diagram of a radio frame format having a radio supervisory control channel.

The transmission halt command and the transmission start command are transmitted by utilizing the radio supervisory control channel. The radio supervisory control channel is inserted in the position of the radio frame format, for example, as shown in FIG. 18. In this case, since the receiving system of the distant office 301 is operating, the control can be received.

(d) Explanation of the Fourth Embodiment

Figure 19:
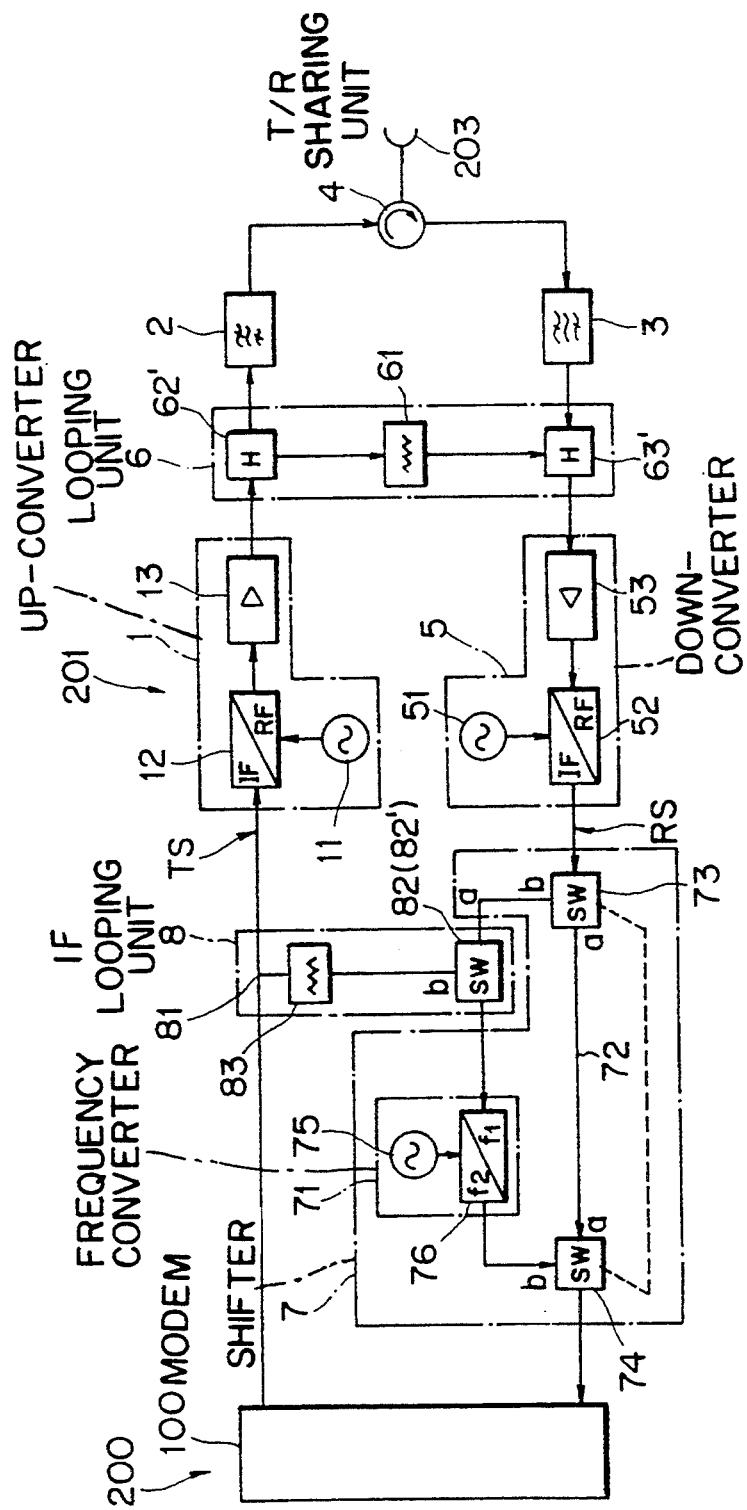
FIG. 19 is a block diagram showing the fourth embodiment according to the present invention.

FIG. 19 is a block diagram showing the fourth embodiment according to the present invention. In the fourth embodiment, a looping (IF looping) in an intermediate frequency band is performed using a part of the RF looping function.

That is, in the fourth embodiment, an IF looping component (intermediate frequency looping means) 8 is arranged as shown in FIG. 19 to loop back the intermediate frequency signal of the transmission system TS to the input of the shifter 7. The IF looping component 8 is constituted of a branching unit (branching means) 81 for deriving a signal from the intermediate frequency band region of the transmission system RS, a synthesizing unit (synthesizing means) 82 for inputting a loop transmission signal to the intermediate frequency band region of the receiving system RS, and an attenuator 83 inserted between the branching unit 81 and the synthesizing unit 82. In this example, the synthesizer 82 is formed as a change-over switch 82'. At least one of the branching unit 81 and the synthesizing unit 82 is constituted as a change-over switch.

The change-over switch 82' is formed in the circuit structure similar to that shown in FIG. 4 and can switch selectively the looping signal in the RF band and the looping signal in the IF band. The change-over switch 82' turns to the side a at the RF looping signal and provides the output of the down-converter 7 to the frequency converter 71. The change-over switch 82' also turns to the side b at the IF looping time and provides a part of the input signal of the up-converter 1 to the frequency converter 71.

Thus since the additional IF looping component 8 loops back the IF signal at the input side of the equipment, a failed IF portion or RF portion in the equipment can be separated. For example, an IF cable 201 in an abnormal state of connecting the modulator/demodulator with the radio apparatus can be detected.

Figure 20:
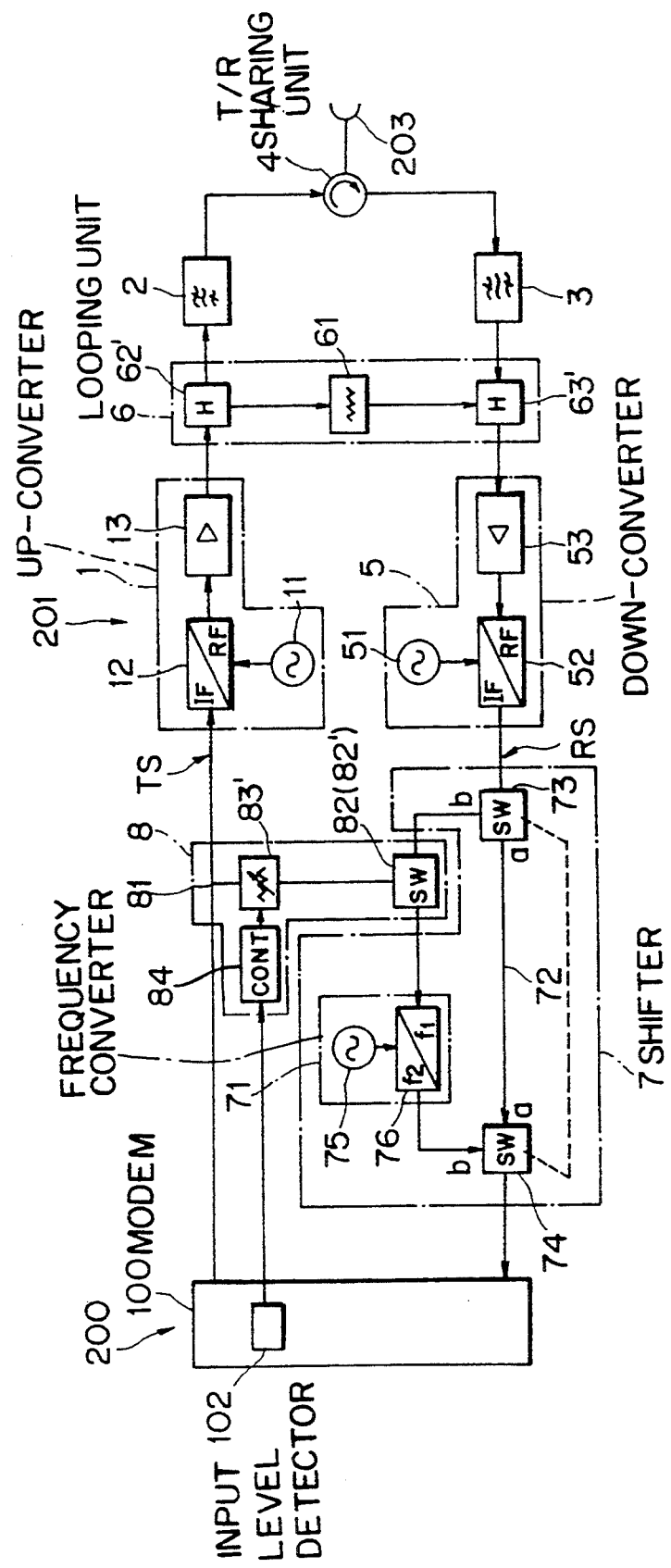
FIG. 20 is a block diagram showing a first modified example according to the fourth embodiment according to the present invention.

In this case, as shown in FIG. 20, an externally controllable variable attenuator 83' may be used instead of the attenuator of the IF looping component 8 and the attenuation amount thereof can be controlled by the control unit 84 in accordance with the receiving signal level, in the same manner as the embodiment shown in FIG. 13.

(e) Explanation of the Fifth Embodiment

Figure 21:
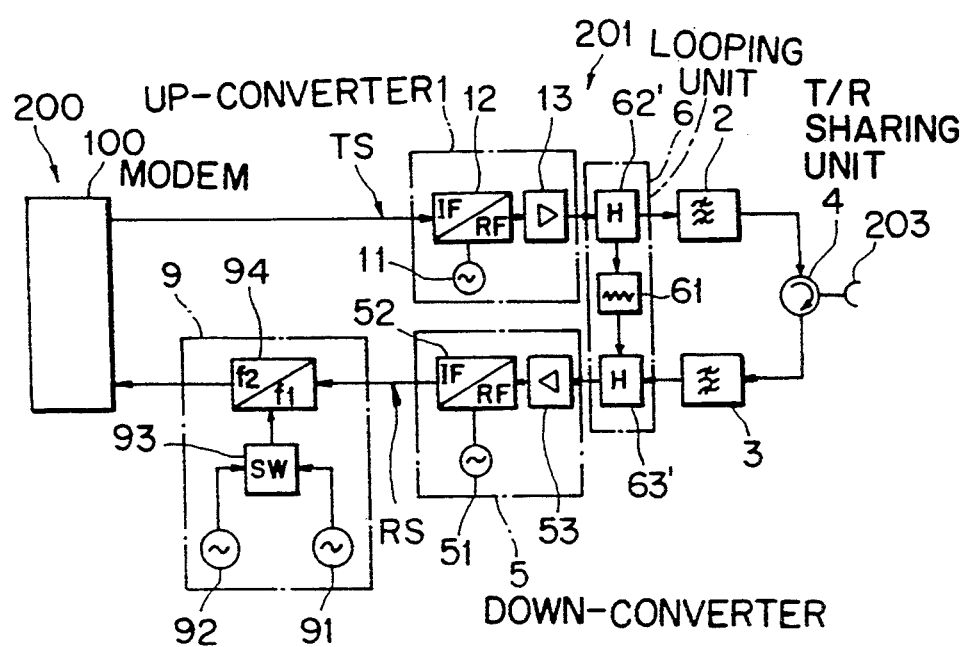
FIG. 21 is a block diagram showing the fifth embodiment according to the present invention.

FIG. 21 is a block diagram showing the fifth embodiment according to the present invention. The fifth embodiment employs the double conversion system which converts a receiving IF frequency twice. The shifter 9 converts the frequency of an intermediate signal converted by the down-converter 5 to a receiving input frequency of the modulator/demodulator 100. The shifter 9 is constituted of a first local oscillator 91 for frequency conversion at a normal time, a second local oscillator 92 for frequency conversion at a looping time, a change-over switch (switching means) 93 for outputting selectively the first frequency converting local oscillator 91 and the second frequency converting local oscillator 92, and a mixer 94 for receiving an output from the change-over switch 93 and an intermediate frequency signal from the down-converter 5 and for converting the intermediate frequency signal into a receiving input frequency of the modulator/demodulator 100.

In the embodiment, the change-over switch 93 selects the first frequency converting local oscillator 91 at a normal time and selects the second frequency converting local oscillator 92 at the loop testing time. The above configuration has an advantage similar to that of the first embodiment.

Figure 23:
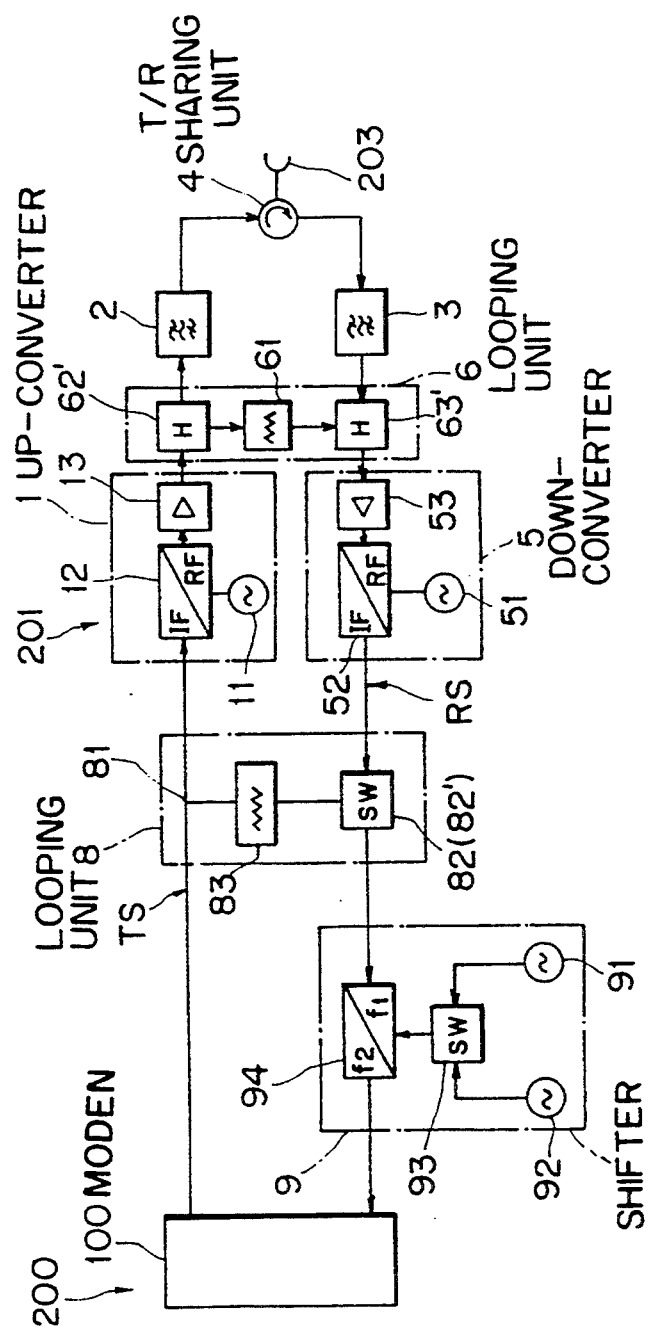
FIG. 23 is a block diagram showing a second modified example according to the fifth embodiment of the present invention.

FIG. 23 shows that the fifth embodiment is modified to perform looping (IF looping) in the intermediate frequency band. As shown in FIG. 23, an IF looping component (intermediate frequency looping means) 8 is arranged to loop back the intermediate frequency signal in the transmission system TS to the input of the shifter 9. The IF looping component 8 also comprises a branching unit (branching means) 81 for deriving a signal from an intermediate frequency band region in the transmission system TS, a synthesizing unit (synthesizing means) 82 for inputting a loop transmission signal to the intermediate frequency band region of the receivilng system RS, and an attenuator arranged between the branching unit 81 and the synthesizing unit (or a change-over switch 82') 82. At least one of the branching unit 81 and the synthesizer unit 82 is constituted as a change-over switch.

Figure 22:
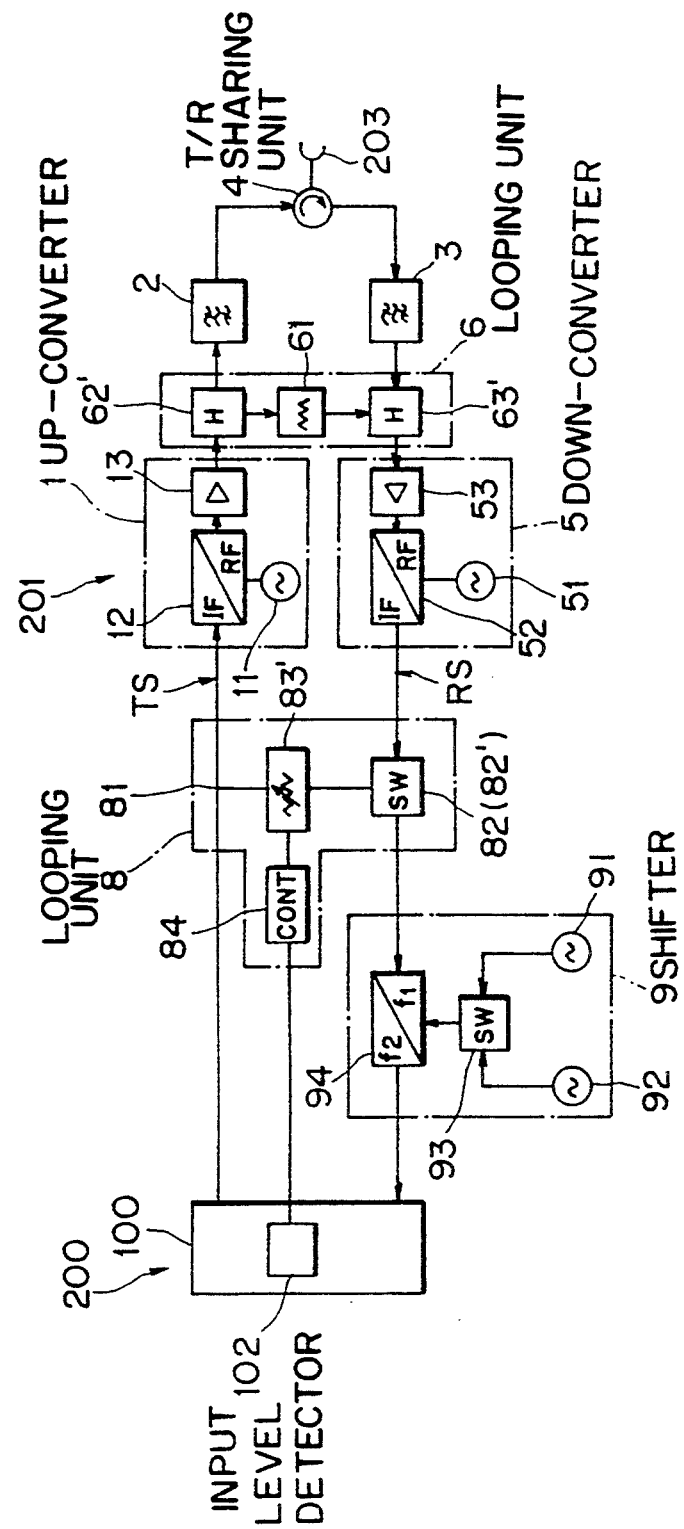
FIG. 22 is a block diagram showing a first modified example according to the fifth embodiment of the present invention.

In this case, as shown in FIG. 22, an externally controllable variable attenuator 83' may be used as the attenuator in the IF looping unit 8 and the control unit 84 may control the attenuation amount thereof in accordance with the receiving signal level, in the similar manner to that shown in FIG. 20.

(f) Explanation of the Sixth Embodiment

Figure 24:
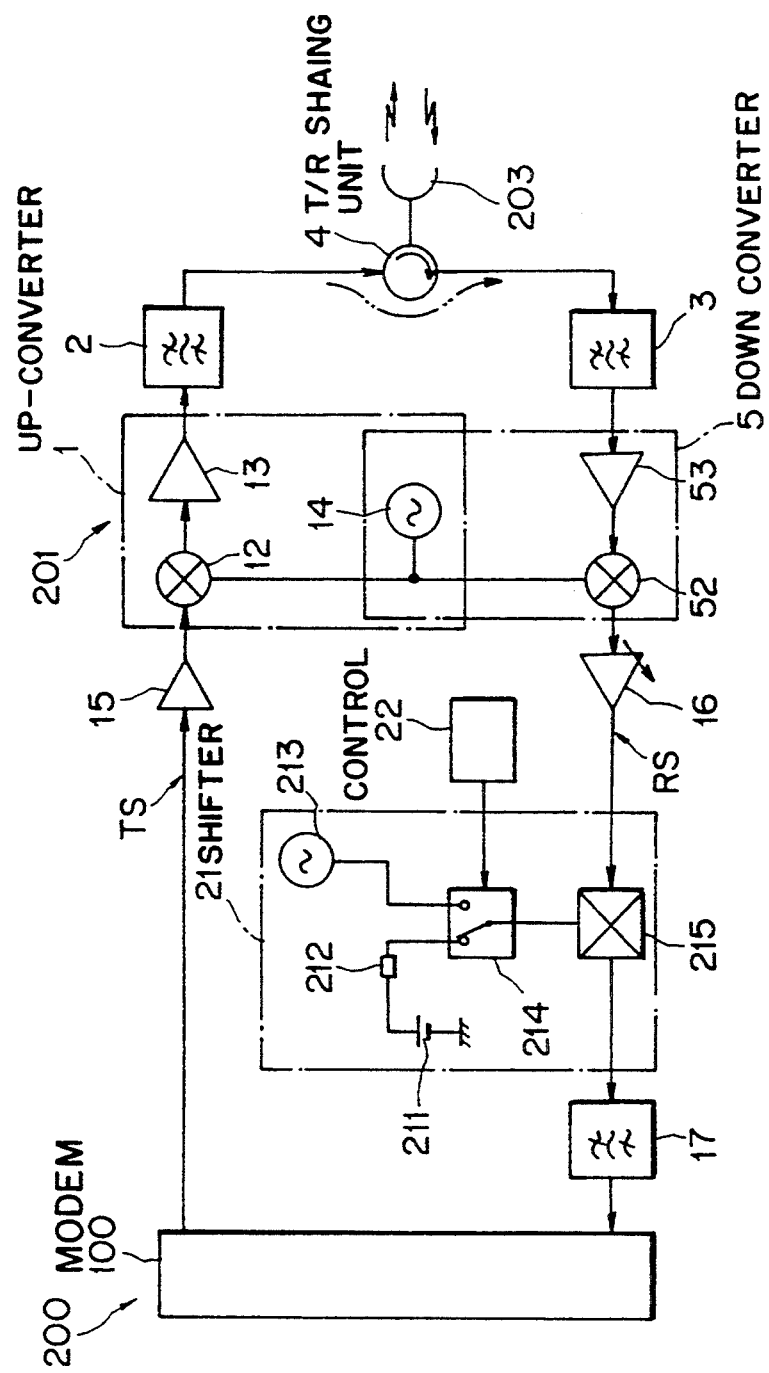
FIG. 24 is a block diagram showing the sixth embodiment according to the present invention.

FIG. 24 is a block diagram showing the sixth embodiment according to the present invention. As shown in FIG. 24, in the sixth embodiment, a transmit/receive sharing unit 4 acts as the RF signal looping system and a leakage (refer to dashed lines in FIG. 24) of the transmission RF signal from the transmit/receive sharing unit 4 is utilized, in the similar manner to that shown in FIG. 8.

In the sixth embodiment, the up-converter 1 and the down-converter 5 share the single local oscillator 14 to makes the whole equipment small.

An IF band amplifier 15 is arranged at the front stage of the up-converter 1 and an AGC amplifier 16 is arranged behind the down-converter 5 to make the output of the down-converter 5 to a fixed voltage. A receiving IF filter derives a receiving IF signal component of a frequency of fRIF and is arranged at the front stage of the receiving signal input terminal of the modulator/demodulator 100.

The shifter (shifter means) 21 converts the IF band signal converted by the down-converter 5 to a signal of the receiving input frequency of the modulator/demodulator 100, and is arranged between the AGC amplifier 16 in the receiving system RS and the receivving IF band filter 17. The shifter 21 also is constituted of a dc power supply 211 for a normal operation, the local oscillator 212 for frequency conversion for a looping operation, switching means 214 for selectively issuing the output of the dc power supply 211 and the output of the local oscillator 212, and a mixer (with a nearly constant conversion loss over dc to an intermediate band 215 for receiving the output of the switching means 214 and for converting the intermediate frequency signal from the down-converter 5 into a signal of the receiving input frequency for the modulator/demodulator device 100.

A current limiting resistor 212 is arranged between the dc power supply 211 and the switching means 214.

The switching means 214 controls its switching state in accordance with the control unit 22.

At a normal operation time, when receiving a command from the control unit 22, the switching means 214 selects the current from the dc power supply 211 to input to the local oscillation input terminal of the mixer 215. In the mixer 215, since the current is a dc current, or a signal of a frequency of 0 Hz, a signal having the same frequency component as that at the input appears at the output.

At the loop testing time, the switching means 214 selects the frequency converting local oscillator 213 in response to the command from the control unit 22 to input to the local oscillation terminal of the mixer 215. The mixer 215 converts the receiving RF signal from the down-converter 5 into a signal of a receiving IF frequency fRIF of the modulator/demodulator 100, and inputs the outcome to the modulator/demodulator 100 via the receiving IF band filter 17.

As described above, according to the sixth embodiment, the shifter 21 has a mixer 215 for converting a receiving RF signal from the down-converter 5 to a signal of the receiving IF frequency fRIF, and switching means 214 for connecting the dc power supply to the mixer 215 at the normal time and for inputting the output of the local oscillator 213 to the mixer 215 at a loop testing time. The mixer 215 switches selectively a normal mode and a loop testing mode, and passes a receiving signal at a normal time and a loop signal being a RF signal at a loop testing time. Since the receiving system level diagram at the normal time is the same as that of the loop testing time, the performance evaluation and the self-diagnosis can be performed accurately.

No special components required at a loop testing time in the receiving system contributes to no switching means such as RF switch and a reduced cost. In addition, no difficulty in a loop testing due to a fault RF switch results in an improved system reliability.

Figure 25:
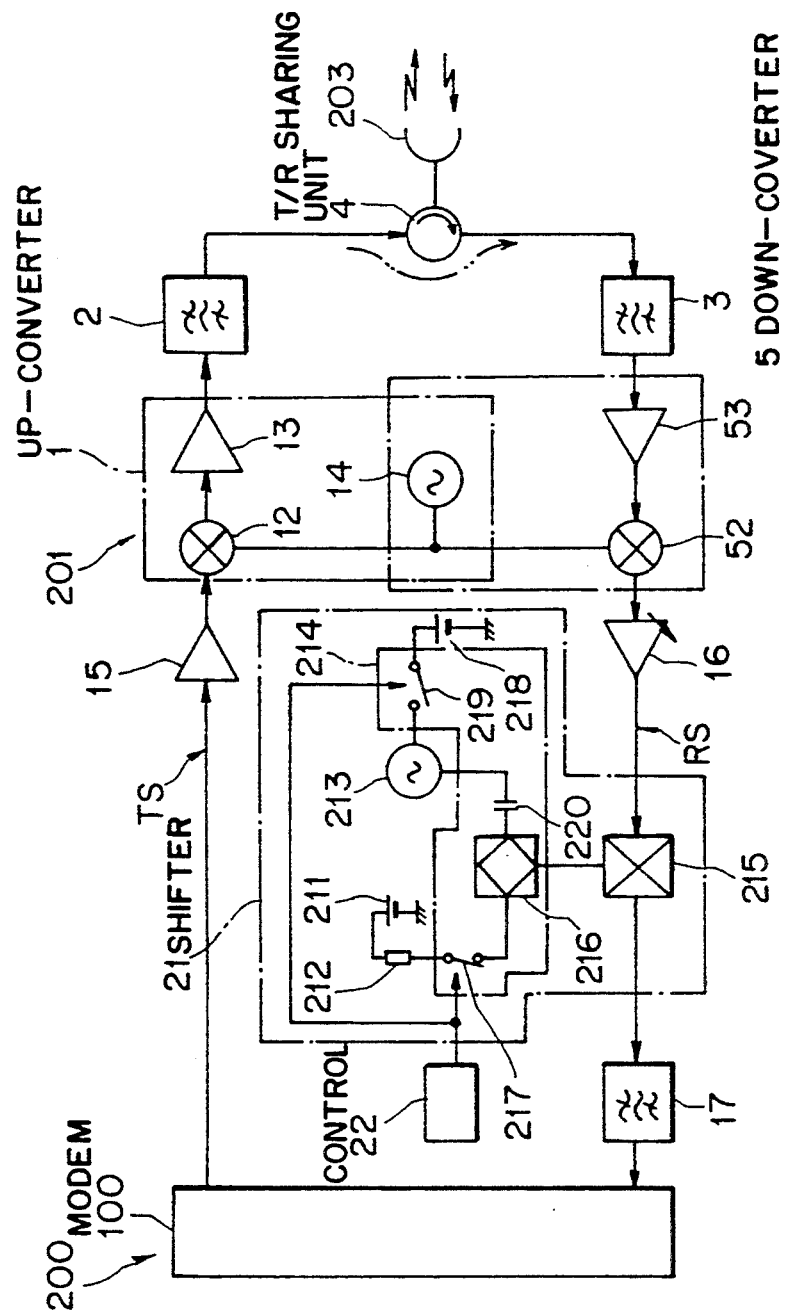
FIG. 25 is a block diagram showing a first modified embodiment according to the sixth embodiment of the present invention.
Figure 26:
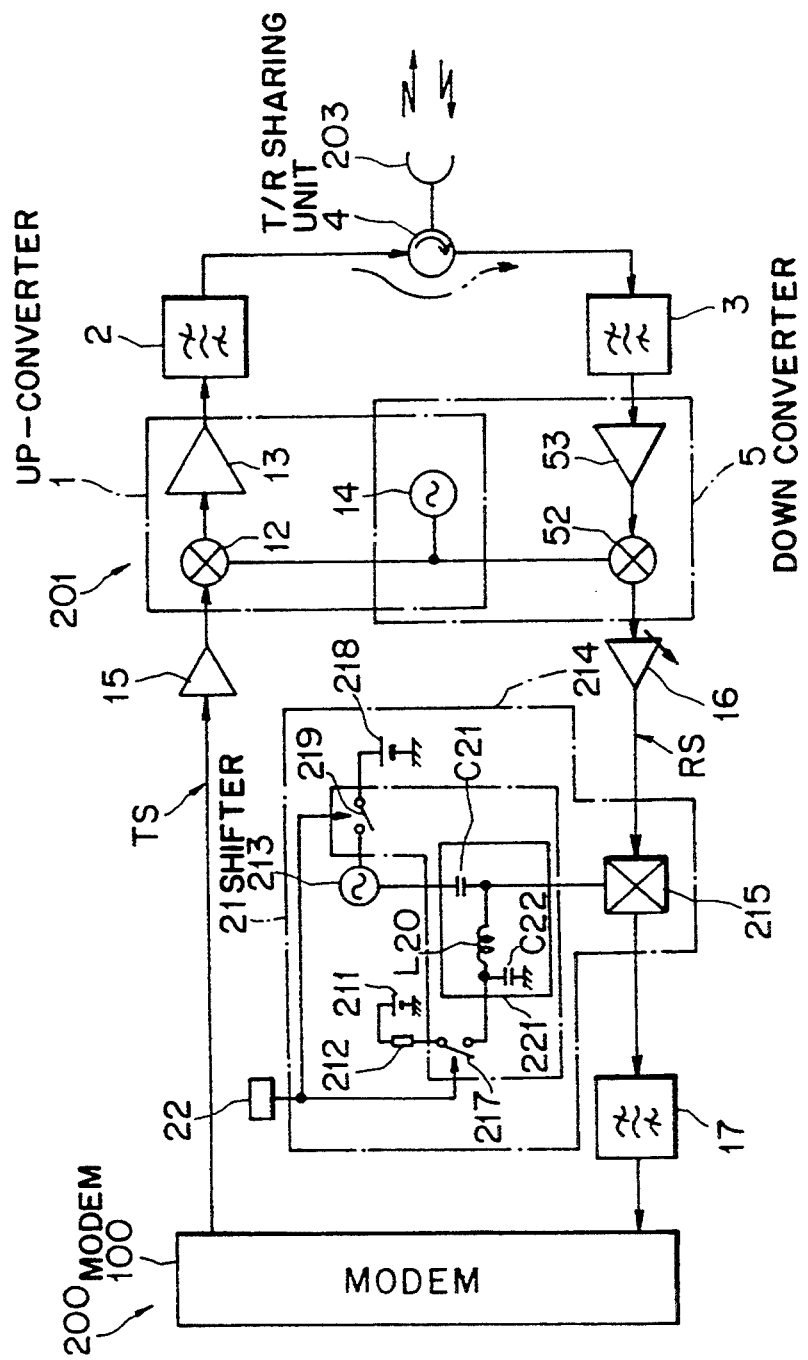
FIG. 26 is a block diagram showing a second modified example according to the sixth embodiment of the present invention.

The switching means 214 of the shifter 21 in the above embodiment may be constituted as shown in FIGS. 25 and 26.

The switching means 214 in the shifter 21, as shown FIG. 25, includes a power synthesizer (hybrid circuit) 216 arranged among the dc power supply 211 (current limiting resistor 212), a frequency converting local oscillator 213, and a mixer 215; a first dc switch 217 arranged between the dc power supply 211 and the power synthesizer 216; and a second dc switch 219 arranged between the local oscillator 213 and the dc power supply 218 for supplying a drive electric power to the local oscillator 213.

The dc switches 217 and 219 are on/off-controlled in accordance with a command from the control unit 22. In concrete, at normal operation, the control unit 22 turns on the first dc switch 217 and simultaneously turns off the second dc switch 219. At loop testing time, the control unit 22 turns off the first dc switch 217 and simultaneously turns on the second dc switch 219.

The power synthesizer 216 has a common terminal connected to the local oscillation terminal of the mixer 215, a branch terminal connected to the dc power supply 211 via the first dc switch 217 and the current limiting resistor 212, and a branch terminal connected to the local oscillator 213 via the dc-cut by-pass capacitor 220.

In the shifter 21, as shown in FIG. 25, at the normal time, since the control unit 22 turns on the first dc switch 217 and turns off the second dc switch 219, a current is supplied to the local oscillation terminal of the mixer 215 via the power synthesizer 216 from the dc power supply 211, whereby the mixer 215 does not executes the frequency conversion.

At the loop testing time, since the control unit 22 turns off the first dc switch 217 and turns on the second dc switch 219, the local oscillator 213 inputs its output to the local oscillation terminal of the mixer 215 via the power synthesizer 216 so that the mixer 215 converts the receiving RF signal from the down-converter 5 into a signal of the receiving frequency fRIF in the modulator/demodulator 100.

Therefore, the normal mode/loop testing mode can be switched by using only the high reliability dc switches 217 and 219 which is lower in price than the RF switch. Thus the device structure can be simplified and realized reduced cost and improved reliability.

The switching means 214 in the shifter 21, as shown in FIG. 26, is formed of a bias T-circuit 221, instead of the power synthesizer (hybrid circuit) 216 shown in FIG. 25. Other elements are similar to those shown in FIG. 25.

The bias T-circuit 221 is formed of a choke coil L20 and two capacitors C21 and C22. The bias T-circuit 221 has a high-frequency/dc common terminal connected to the local oscillation terminal of the mixer 215, a hf terminal connected to the local oscillator 213, and a dc terminal connected to the dc power supply 211 via the first dc switch 217 and the current limiting resistor 212.

The bias T-circuit 221 forms always a high-frequency signal pass between the local oscillator 213 and the mixer 215. When the dc signal source (a current from the dc power supply 211) is supplied to the pass, the dc signal source is separated off by making high the apparent impedance to the dc signal source side at the connecting point of the dc signal and the hf signal so that a current from the dc power supply 211 does not influence the hf signal from the local oscillator 213.

The bias T-circuit 221 can decrease the passage loss between the local oscillator 213 and the mixer 215 and enables the use of the local oscillator 213 of low power output and low power consumption, thus leading to reduced cost of the equipment.

(g) Explanation of the Seventh Embodiment

Figure 27:
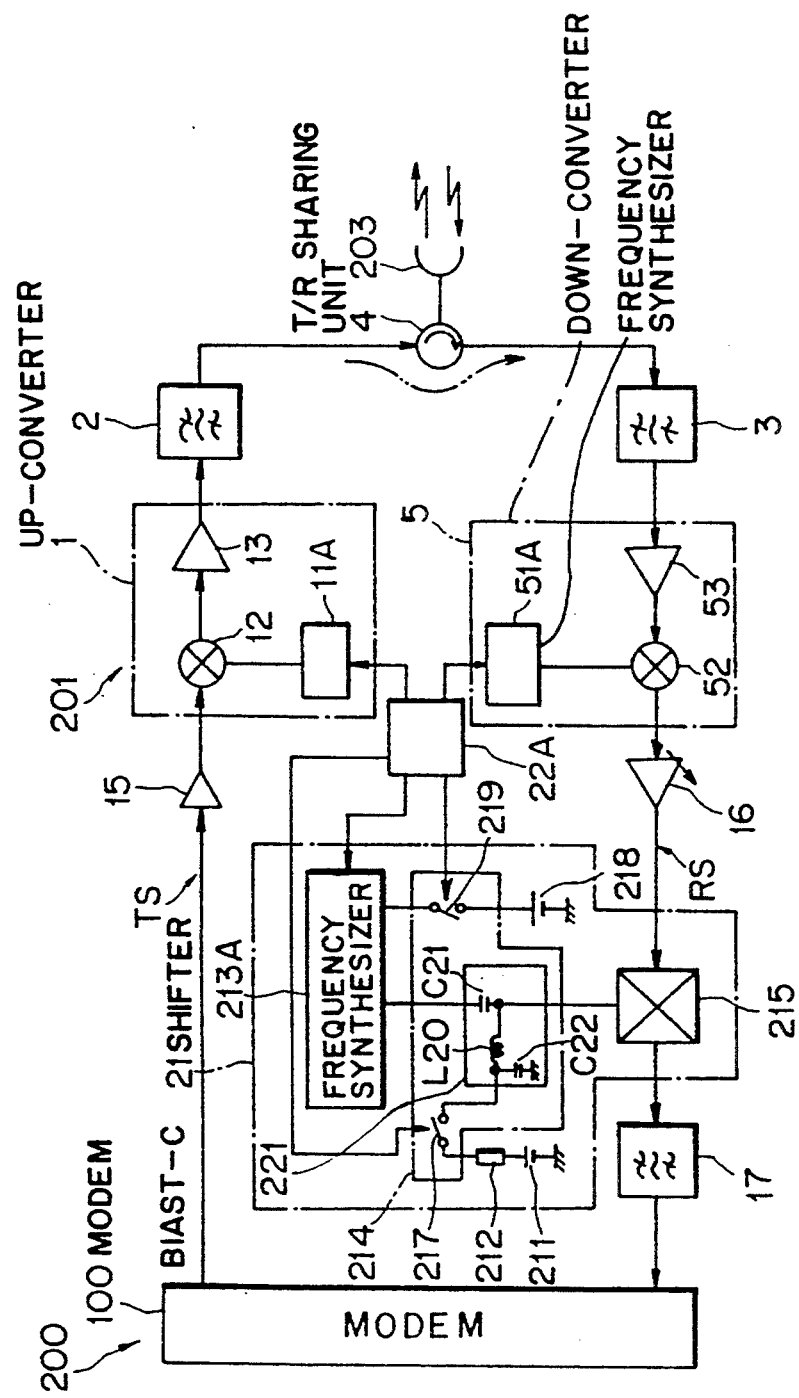
FIG. 27 is a block diagram showing the seventh embodiment according to the present invention.

FIG. 27 is a block diagram showing the seventh embodiment according to the present invention. As shown in FIG. 27, the equipment of the seventh embodiment has a similar configuration to that of the sixth embodiment but the shifter 21 includes a bias T-circuit 221 (refer to FIG. 26).

As shown in FIG. 27, variable frequency synthesizers 11A and 51A are used as a local oscillator for the up-converter 1 and the down-converter 5, respectively, and a variable frequency synthesizer 213A is used as the frequency converting local oscillator in the shifter 21.

Like the sixth embodiment, the control unit 22A executes the on/off control of the dc switches 217 and 219 in the shifter 21 and controls the oscillation frequency of the frequency synthesizers 11A, 51A, and 213A. The control unit 22A also controls the oscillation frequency of the frequency synthesizer 213A in accordance with the frequency of a transmission signal in the transmission system TS.

According to the present invention, at the loop testing time, when the frequency of the transmission signal in the transmission system TS is varied to a set value, the control unit 22A can control the oscillation signal of the frequency synthesizer 213A to the set value, whereby the mixer 215 always converts the intermediate frequency signal from the down-converter 5 to a fixed receiving input frequency at a looping operation time.

What is claimed is:

1. A loop testable radio transmitter/receiver, comprising:
   a transmission system including transmission frequency converting means for converting an intermediate frequency signal from a modulator/demodulator into a transmission frequency signal, and a transmission signal filter means for suppressing an undesired wave contained in the transmission frequency signal from said transmission frequency converting means;
   a receiving system including receiving signal filter means for suppressing an undesired wave contained in a receiving frequency signal, and receiving frequency converting means for converting a signal from said receiving signal filter means into an intermediate frequency signal for said modulator/demodulator;
   transmit/receive sharing means, coupled between said transmission signal filter means and said receiving signal filter means, for outputting a transmission signal from said transmission system to an antenna and for outputting a receiving signal from said antenna to said receiving system;
   transmission signal looping means, coupled between said transmission system and said receiving system, for attenuating the transmission signal of said transmission system and for looping back the transmission signal to the receiving system; and
   shifter means arranged to an output side of said receiving frequency converting means in said receiving system for converting an intermediate frequency of a signal converted by said receiving frequency converting means into a receiving input frequency of said modulator/demodulator.

2. A loop testable radio transmitter/receiver according to claim 1, wherein said transmission signal looping means comprises:
   a branching directional coupler, coupled to said transmission frequency converting means, for deriving a looping transmission signal from a transmission frequency band region of said transmission system, a synthesizing directional coupler coupled to said receiving frequency converting means, for inputting the looping transmission signal to a receiving frequency band region of said receiving system, and an attenuator arranged between said branching directional coupler and said synthesizing directional coupler.

3. A loop testable radio transmitter/receiver according to claim 2, wherein at least one of said branching directional coupler and said synthesizing directional coupler is constituted as a change-over switch.

4. A loop testable radio transmitter/receiver according to claim 2, wherein said transmission signal looping means is inserted between the transmission frequency band region of the output side of said transmission signal filter means in said transmission system and the receiving frequency band region of the input side of said receiving signal filter means in said receiving system.

5. A loop testable radio transmitter/receiver according to claim 2, further comprising an on/off switch arranged near an input side of said receiving system and coupled with said synthesizing directional coupler.

6. A loop testable radio transmitter/receiver according to claim 2, wherein said attenuator is constructed as a variable attenuator, and further comprising a receiving input level detecting means provided at said modulator/demodulator for detecting a receiving input level, and control means, coupled between said attenuator and said receiving input level detecting means, for controlling an attenuation amount of said attenuator in accordance with the receiving input level detected by said receiving input level detecting means.

7. A loop testable radio transmitter/receiver according to claim 1, wherein said transmission signal looping means is inserted between a transmission frequency band region between said transmission frequency converting means and said transmission signal filter means in said transmission system and a receiving frequency band region between said receiving signal filter means and said receiving frequency converting means in said receiving system.

8. A loop testable radio transmitter/receiver according to claim 1, wherein said transmit/receive sharing means acts as said transmission signal looping means.

9. A loop testable radio transmitting/receiver according to claim 1, wherein said transmission system includes an intermediate frequency signal looping means for looping an intermediate frequency signal from said modulator/demodulator in said transmission system to an input side of said shifter means.

10. A loop testable radio transmitter/receiver according to claim 9, wherein said intermediate frequency signal looping means comprises:
    branching means, coupled to said modulator/demodulator, for deriving a looping transmission signal from an intermediate frequency band region in said transmission system;
    synthesizing means, coupled between said branching means and said receiving system, for inputting said looping transmission signal to said intermediate frequency band region in said receiving system; and
    attenuator inserted between said branching means and said synthesizing means.

11. A loop testable radio transmitter/receiver according to claim 10, wherein at least one of said branching means and synthesizing means is constituted as a change-over switch.

12. A loop testable radio transmitter/receiver according to claim 10, wherein said attenuator is constituted as a variable attenuator, and further comprising a receiving input level detecting means provided at said modulator/demodulator, for detecting a receiving input level, and control means, coupled to said detecting means and said attenuator, for controlling an attenuation amount of said attenuator in accordance with the receiving input level detected by said receiving input level detecting means.

13. A loop testable radio transmitter/receiver according to claim 1, wherein said shifter means comprises:
    transmission signal shifter means for converting a transmission signal of an intermediate frequency band converted by said receiving frequency converting means, into said receiving input frequency of said modulator/demodulator;
    by-pass means for by-passing said transmission signal shifter means; and
    selecting means for inputting selectively an output of said receiving frequency converting means to either said transmission signal shifter means or said by-pass means.

14. A loop testable radio transmitter/receiver according to claim 13, further comprising switching means for deriving a signal from either said transmission signal shifter means or said by-pass means, in cooperation with said selecting means.

15. A loop testable radio transmitter/receiver according to claim 1; wherein said shifter means comprises:
 a first local oscillator for frequency conversion at a normal operation time;
 a second local oscillator for frequency conversion at a looping operation time;
 switching means for outputting selectively either an output from said first frequency converting local oscillator or an output from said second frequency converting local oscillator; and
 a mixer, coupled to said switching means, and adapted for converting said intermediate frequency signal to said receiving input frequency of said modulator/demodulator upon receipt of an output from said switching means and said intermediate frequency signal from said receiving frequency converting means.

16. A loop testable radio transmitter/receiver according to claim 1, said modulator/demodulator includes control means for transmitting at a loop testing time a command for halting a transmission from a remote communication office to an intra-office.

17. A loop testable radio transmitter/receiver according to claim 1, wherein said shifter means comprises:
 a direct-current power supply for a normal operation time;
 a frequency converting local oscillator at a looping operation time;
 control means;
 switching means, controlled by said control means, for outputting selectively either an output from said direct-current power supply or an output from said frequency converting local oscillator; and
 a mixer coupled to said switching means and adapted for converting said intermediate frequency signal to the receiving input frequency of said modulator/demodulator, upon receipt of an output from said switching means and said intermediate frequency signal from said receiving frequency converting means.

18. A loop testable radio transmitter/receiver according to claim 17, wherein said switching means comprises:
 a hybrid circuit for inserted between said direct-current power supply and said frequency converting local oscillator, and said mixer;
 a first direct-current switch inserted between said direct-current power supply and said hybrid circuit; and
 a second direct-current switch inserted between said frequency converting local oscillator and a direct-current power supply for supplying a drive electric power to said frequency converting local oscillator.

19. A loop testable radio transmitter/receiver according to claim 18, wherein said control means operates for turning on said first direct-current switch at said normal operation time while for turning off said second direct-current switch, and for turning off said first direct-current switch at said looping operation time while turning on said second direct-current switch.

20. A loop testable radio transmitter/receiver according to claim 18, wherein said hybrid circuit comprises a bias T-circuit.

21. A loop testable radio transmitter/receiver according to claim 17, wherein said frequency converting local oscillator is constituted as a frequency synthesizer, said control means controlling the oscillating frequency of said frequency synthesizer in accordance with a transmission frequency of the transmission signal in said transmission system.

* * * * *